(12) United States Patent
Arsan et al.

(10) Patent No.: US 10,204,450 B2
(45) Date of Patent: *Feb. 12, 2019

(54) GENERATING STATE-ON-STATE DATA FOR HIERARCHICAL CLUSTERS IN A THREE-DIMENSIONAL MODEL REPRESENTING MACHINE DATA

(71) Applicant: SPLUNK INC., San Francisco, CA (US)

(72) Inventors: Roy Arsan, Sunnyvale, CA (US); Alexander Raitz, San Francisco, CA (US); Clark Allan, San Jose, CA (US); Cary Glen Noel, Pleasant Hill, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,436

(22) Filed: Apr. 30, 2018

(65) Prior Publication Data

US 2018/0253898 A1    Sep. 6, 2018

Related U.S. Application Data

(63) Continuation of application No. 15/498,436, filed on Apr. 26, 2017, now Pat. No. 9,990,769, which is a
(Continued)

(51) Int. Cl.
*G06T 19/00* (2011.01)
*G06T 15/00* (2011.01)
*G06T 15/20* (2011.01)

(52) U.S. Cl.
CPC .......... *G06T 19/003* (2013.01); *G06T 15/005* (2013.01); *G06T 15/20* (2013.01)

(58) Field of Classification Search
None
See application file for complete search history.

(56) References Cited

U.S. PATENT DOCUMENTS 5,528,735 A    6/1996 Strasnick et al.
6,031,547 A    2/2000 Kennedy
(Continued)

OTHER PUBLICATIONS

Amoud De Boer, et al., "Processing 30 Gee-Information for Augmenting Georeferenced and Oriented Photographs with Text Labels", 2008, in A. Ruas & C. Gold (Eds.), Headway in spatial data handling. Lecture Notes in Geoinformation and Cartography (pp. 351-365). Berlin, Heidel.
(Continued)

*Primary Examiner* — Michael J Cobb
(74) *Attorney, Agent, or Firm* — Artegis Law Group, LLP

(57) ABSTRACT

Systems and methods according to various embodiments enable a user to view three-dimensional representations of data objects ("nodes") within a 3D environment from a first person perspective. The system may be configured to allow the user to interact with the nodes by moving a virtual camera through the 3D environment. The nodes may have one or more attributes that may correspond, respectively, to particular static or dynamic values within the data object's data fields. The attributes may include physical aspects of the nodes, such as color, size, or shape. The system may group related data objects within the 3D environment into clusters that are demarked using one or more cluster designators, which may be in the form of a dome or similar feature that encompasses the related data objects. The system may enable multiple users to access the 3D environment simultaneously, or to record their interactions with the 3D environment.

30 Claims, 13 Drawing Sheets

Related U.S. Application Data continuation of application No. 14/266,523, filed on Apr. 30, 2014.

(60) Provisional application No. 61/860,895, filed on Jul. 31, 2013.

(56) References Cited

U.S. PATENT DOCUMENTS

| | | | |
|---|---|---|---|
| 6,111,578 A | 8/2000 | Tesler | |
| 6,188,403 B1 | 2/2001 | Sacerdoti et al. | |
| 6,320,586 B1 | 11/2001 | Plattner et al. | |
| 6,362,817 B1 | 3/2002 | Powers et al. | |
| 6,460,049 B1 | 10/2002 | Becker et al. | |
| 6,480,194 B1 | 11/2002 | Sang'udi et al. | |
| 6,906,709 B1 | 6/2005 | Larkin et al. | |
| 6,968,511 B1 | 11/2005 | Robertson et al. | |
| 7,379,994 B2 | 5/2008 | Collazo | |
| 7,567,844 B2 | 7/2009 | Thomas et al. | |
| 9,047,705 B1 | 6/2015 | Ko | |
| 9,990,769 B2 * | 6/2018 | Arsan | G06T 19/003 |
| 2002/0050988 A1 | 5/2002 | Petrov et al. | |
| 2002/0158969 A1 | 10/2002 | Gupta | |
| 2004/0090472 A1 | 5/2004 | Risch et al. | |
| 2004/0150715 A1 | 8/2004 | Wilcock et al. | |
| 2005/0033605 A1 | 2/2005 | Bergeron et al. | |
| 2005/0183041 A1 | 8/2005 | Chiu et al. | |
| 2006/0044307 A1 | 3/2006 | Song | |
| 2007/0094041 A1 | 4/2007 | Coale et al. | |
| 2007/0226678 A1 | 9/2007 | Li et al. | |
| 2007/0277112 A1 | 11/2007 | Rossler et al. | |
| 2008/0070684 A1 | 3/2008 | Haigh-Hutchinson | |
| 2008/0244091 A1 | 10/2008 | Moore et al. | |
| 2009/0132285 A1 | 5/2009 | Jakobovits | |
| 2009/0249290 A1 | 10/2009 | Jenkins et al. | |
| 2010/0066559 A1 | 3/2010 | Judelson | |
| 2010/0088619 A1 | 4/2010 | Rath et al. | |
| 2010/0321391 A1 | 12/2010 | Rubin et al. | |
| 2010/0328344 A1 | 12/2010 | Mattila et al. | |
| 2011/0169927 A1 | 7/2011 | Mages et al. | |
| 2011/0173576 A1 | 7/2011 | Murphy et al. | |
| 2011/0179134 A1 | 7/2011 | Mayo et al. | |
| 2011/0275409 A1 | 11/2011 | Lee et al. | |
| 2011/0279446 A1 | 11/2011 | Castro et al. | |
| 2011/0279453 A1 | 11/2011 | Murphy et al. | |
| 2011/0283223 A1 | 11/2011 | Vaittinen et al. | |
| 2012/0050285 A1 | 3/2012 | Kannenberg | |
| 2012/0079431 A1 | 3/2012 | Toso | |
| 2012/0096403 A1 | 4/2012 | Jung et al. | |
| 2012/0162265 A1 | 6/2012 | Heinrich et al. | |
| 2012/0246170 A1 | 9/2012 | Iantorno | |
| 2012/0296609 A1 | 11/2012 | Khan et al. | |
| 2013/0030699 A1 | 1/2013 | Barnes et al. | |
| 2013/0110838 A1 | 5/2013 | Lidy et al. | |
| 2013/0144916 A1 | 6/2013 | Lum et al. | |
| 2014/0002457 A1 | 1/2014 | Swindell et al. | |
| 2014/0074887 A1 | 3/2014 | Neels et al. | |
| 2014/0089209 A1 | 3/2014 | Akcamete et al. | |
| 2014/0114970 A1 | 4/2014 | Prabu et al. | |
| 2014/0337477 A1 | 11/2014 | Fisher et al. | |
| 2015/0002539 A1 | 1/2015 | Li et al. | |
| 2015/0035822 A1 | 2/2015 | Arsan et al. | |
| 2018/0253898 A1 * | 9/2018 | Arsan | G06T 15/20 |

OTHER PUBLICATIONS

Ebenezer Hailemariam, Michael Glueck, Ramtin Attar, Alex Tessier, James McCrae, Azam Khan, Toward a Unified Representation System of Performance-Related Data, 2010, 6th IBPSA Canada Conference, Winnipeg, Canada, pp. 117-124.

Hackers, Hackers Final Showdown, 1995, retrieved from <<http://www.criticalcommons.org/Members/ironman28/clips/hackers-final-showdown/view>>, accessed Jan. 8, 2017.

Andreas Kneib, Happy Gliding, 2010, retrieved from «https://nnc3.com/mags/LM10/Magazine/Archive/2010/114/084-085_tdfsb/article.html», accessed Jan. 9, 2017.

Ledion Bitincka, Archana Ganapathi, Stephen Sorkin, Steve Zhang, Optimizing Data Analysis with a Semi-structured Time Series Database, 2010, Proceedings of the 2010 Workshop on Managing Systems Via Log Analysis and Machine Learning Techniques.

Yoshikazu Kamoshida, et al., "Scalable Data Gathering for Real-time Monitoring Systems on Distributed Computing", 2008, 8th IEEE International Symposium on Cluster Computing and the Grid, p. 425-432, DOI: 10.1109/CGRID.2008.102.

Sandip Agarwala, et al., "Resource-Aware Stream Management with the Customizable dproc Distributed Monitoring Mechanisms", 2003,12th IEEE International Symposium on High Performance Distributed Computing, p. 1-10, DOI:10.1109/HPDC.2003.1210034.

Evan Hoke, et al., "InteMon: Continuous Mining of Sensor Data in Largescale Self-Infrastructures", 2006, ACM SIGOPS Operating Systems Review, 40{3}:38-44.

* cited by examiner

EXPECTED SEARCH FIELDS

| FIELD | ENTITY | 3D FACET | VALUES | REQUIRED |
|---|---|---|---|---|
| NAME | NODE, CLUSTER | BANNER ON TOP OF ENTITY | ARBITRARY STRING, DEFAULT = NONE | YES |
| PARENT | NODE | NAME OF PARENT CLUSTER CONTAINING GIVEN NODE | ARBITRARY STRING, DEFAULT = NONE | YES |
| WIDTH | NODE | WIDTH OF NODE RECTANGULAR BOX | PERCENTAGE [0,100] CORRESPONDING TO [200,600] UNITS, DEFAULT = 0 | NO |
| HEIGHT | NODE | HEIGHT OF NODE RECTANGULAR BOX | PERCENTAGE [0,100] CORRESPONDING TO [600,1800] UNITS, DEFAULT = 0 | NO |
| DEPTH | NODE | DEPTH OF NODE RECTANGULAR BOX | PERCENTAGE [0,100] CORRESPONDING TO [200,600] UNITS, DEFAULT = 0 | NO |
| COLORSCALE | NODE, CLUSTER | COLOR OF ENTITY SHOWING A METER SCALE FROM GREEN TO RED | PERCENTAGE [0,100] CORRESPONDING TO [GREEN-YELLOW-RED] SPECTRUM, DEFAULT = 0 | NO |
| DISPLAYINFO | NODE | TEXT RENDERED ON AN ENTITY'S DYNAMIC BILLBOARD | SMALL MULTI-LINE TEXT WITH ESCAPED NEWLINES:\n, DEFAULT = "" | NO |

GENERATING STATE-ON-STATE DATA FOR HIERARCHICAL CLUSTERS IN A THREE-DIMENSIONAL MODEL REPRESENTING MACHINE DATA

CROSS-REFERENCE TO RELATED APPLICATIONS

This application is a continuation of co-pending U.S. Patent Application titled, "CONVEYING STATE-ON-STATE DATA TO A USER VIA HIERARCHICAL CLUSTERS IN A THREE-DIMENSIONAL MODEL," filed Apr. 26, 2017 and having Ser. No. 15/498,436, which is a continuation of co-pending U.S. Patent Application titled, "SYSTEMS AND METHODS FOR USING A THREE-DIMENSIONAL, FIRST PERSON DISPLAY TO CONVEY DATA TO A USER," filed Apr. 30, 2014 and having Ser. No. 14/266,523, which claims priority benefit of the United States Provisional Patent Application titled "SYSTEMS AND METHODS FOR USING A THREE-DIMENSIONAL, FIRST PERSON DISPLAY TO CONVEY DATA TO A USER," filed Jul. 31, 2013 and having Ser. No. 61/860,895. The subject matter of these related applications is hereby incorporated herein by reference.

TECHNOLOGY

The present invention relates generally to information systems, and in particular, to generating state-on-state data for hierarchical clusters in a three-dimensional model representing.

BACKGROUND

Information systems generate vast amounts of information from which it can be difficult to extract particular data that is important to the user. Although the development of computers and software has been staggering in many ways, existing computer systems are still limited in their capacity to convey large amounts of data in a way that users can digest and understand quickly. Because the amount of relevant data that is available for analysis continues to increase significantly from year to year, the need for improved tools for communicating such data to users is becoming urgent.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2 is a chart of example node attributes and the data to which the attributes correspond, according to a particular embodiment;

DESCRIPTION OF EXAMPLE EMBODIMENTS

Figure 1:
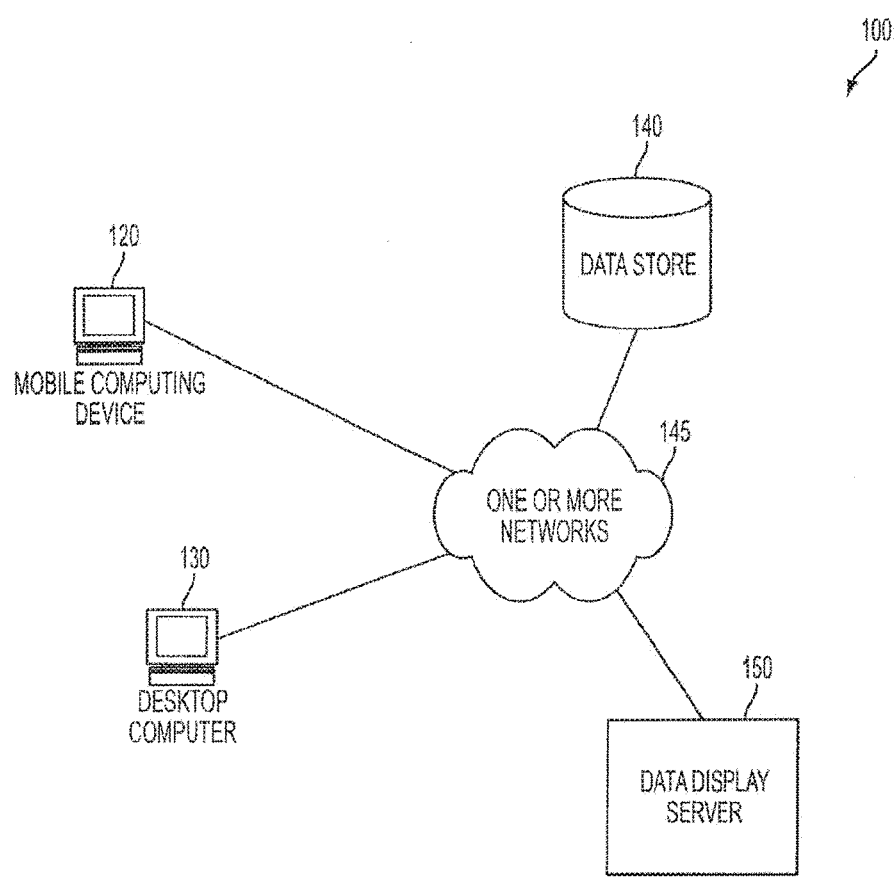
FIG. 1 is a block diagram of a data display system in accordance with an embodiment of the present system.

Example embodiments, which relate to extracting and viewing data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURE OVERVIEW
3. SETUP MODULE
4. DISPLAY MODULE
5. EXAMPLE THREE-DIMENSIONAL ENVIRONMENTS
6. NODES
7. CLUSTER DESIGNATORS
8. HIERARCHIES OF COMPONENTS
9. MULTIPLE USERS
10. MARKING OF NODES
11. RECORD AND PLAYBACK
12. DYNAMIC NATURE OF DATA
13. DATA TRACING
14. EXAMPLE DATA SOURCES
15. EXAMPLE SYSTEM OPERATION
16. EXAMPLE DATA COLLECTION SYSTEM
17. ADDITIONAL TECHNICAL DETAILS
18. EXAMPLE PROCESS FLOW
19. EXAMPLE SYSTEM ARCHITECTURE
20. EQUIVALENTS, EXTENSIONS, ALTERNATIVES AND MISCELLANEOUS

1. General Overview

This overview presents a basic description of some aspects of embodiment(s) of the present invention. It should be noted that this overview is not an extensive or exhaustive summary of aspects of the embodiment. Moreover, it should be noted that this overview is not intended to be understood as identifying any particularly significant aspects or elements of the embodiment(s), nor as delineating any scope of the embodiment(s) in particular, nor the invention in general. This overview merely presents some concepts that relate to example embodiments in a condensed and simplified format, and should be understood as merely a conceptual prelude to a more detailed description of example embodiments that follows below.

A computer system, according to various embodiments, is adapted to allow a user to view three-dimensional ("3D") representations of data within a 3D environment (e.g., a 3D space, a 3D spatial region, etc.) from a first person perspective (e.g., on a two or three-dimensional display screen, or on any other suitable display screen, etc.). The system may be configured to allow the user to interact with the data by freely and dynamically moving (e.g., translating, panning, orienting, tilting, rolling, etc.) a virtual camera—which may represent a particular location of the user as represented in the 3D environment with a particular visual perspective—through the 3D environment. This may provide the user with a clearer understanding of the data. In particular embodiments, the data, which may correspond to one or more attributes of virtual or real-world objects, is updated dynamically in real time so that the user may visually experience changes to the data at least substantially in real time.

As a particular example, a particular three-dimensional representation of values stored within a particular data object may have one or more physical or non-physical attributes (e.g., "facets," "aspects," "colors," "textures," "sizes," visual effects, etc.) that each reflect the value of a data field within the data object. For the purposes of illustration, a data object may be a location in memory that has a value and that is referenced by an identifier. A data object may be, for example, a variable, a function, or a data structure. It is in no way limited to objects of the kind used in object-oriented programming, although it may include those.

In particular embodiments, the three-dimensional representation of values may be a three-dimensional object (e.g., a node, a shape, a rectangle, a regular shape, an irregular shape, etc.). As a particular example, the node may be a rectangular prism that corresponds to a data object that indicates the usage, by a particular computer application, of a particular computer's resources. In this example: (1) the size of the rectangular prism may correspond to the percentage of the system's memory that the application is using at a particular point in time; and (2) the color of the rectangular prism may indicate whether the application is using a small, medium, or large amount of the system's memory at that point in time. For example, the color of the sphere may be displayed as: (1) green when the application is using 15% or less of the system's memory; (2) yellow when the application is using between 15% and 50% of the system's memory; and (3) red when the application is using 50% or more of the system's memory. In this case, the fact that a particular rectangular prism is red is intended to alert a user to the fact that the application to which the rectangular prism corresponds is using an unusually large amount of the system's memory.

In various embodiments, the system is adapted to display, in one or more displayed views of the three-dimensional environment, nodes that correspond to related data objects in a cluster in which the various related data objects are proximate to each other. The system may also display, in one or more displayed views of the three-dimensional environment, a cluster designator adjacent the group of related nodes that serves to help a user quickly identify a group as a related group of nodes. For example, the system may display a group of nodes on a virtual "floor" within the three-dimensional environment and display a semi-transparent dome-shaped cluster designator adjacent and over the group of nodes so that the cluster designator encloses all of the nodes to indicate that the nodes are related. The system may also display text on or adjacent to the dome that indicates the name of the group of nodes.

As noted above, the system may be adapted to modify the appearance of a particular node, in one or more displayed views of the three-dimensional environment, to an alert configuration/indicator/status to alert users that the value of one or more fields of the data object that corresponds to the node is unusual and/or requires immediate attention, such as because the value has exceeded a user-defined threshold. In particular embodiments, the system accomplishes this by changing the value of one or more attributes that are mapped to the node. In particular embodiments, the system may be configured to modify the appearance of a particular cluster designator to alert users that one or more nodes within the cluster designator are in an alert status. For example, the system may change the color of the cluster designator to red if any of the nodes within the cluster designator turn red to indicate an alert. This is helpful in drawing the user's attention first to the cluster designator that contains the node of immediate concern, and then to the node itself.

In particular embodiments, once the value of the data within the data object of interest returns to normal, the system turns the color of the related node to a non-alert color. Likewise, a cluster designator in one or more displayed views of the three-dimensional environment may change color based on more than a user-defined number of the nodes within it being in an alert status. The system will also return the color of the cluster designator to a non-alert color when there are no longer more than a user-defined number of nodes within the cluster designator in an alert status.

In particular embodiments, a second-level cluster designator may be used to contain one or more cluster designators in the three-dimensional environment. Additionally, optionally, or alternatively, the second-level cluster designator may comprise one or more nodes. This configuration may serve to help a user quickly identify and reference groups of cluster designators. For example, the system may display a semi-transparent sphere-shaped second-level cluster designator adjacent multiple first-level cluster designators (such as the dome-shaped nodes discussed above) so that the second-level cluster designator encloses each of the first-level cluster designators and any nodes within the first-level cluster designators. The system may also display text on or adjacent the sphere that indicates the name of the group of cluster designators. In particular embodiments, the system may be configured to modify the appearance of a particular second-level cluster designator (e.g., in the manner discussed above in regard to first-level cluster designators, etc.) to alert users that one or more first-level cluster designators and/or nodes within the second-level cluster designator are in an alert status.

The system may also allow users to mark various nodes or cluster designators by changing, or adding to, the appearance of the nodes or cluster designators. For example, the system may be adapted to allow a user to attach a marker, such as a flag, to a particular node of interest. This may allow the user, or another user, to easily identify the node during a later exploration of the three-dimensional environment.

In particular embodiments, the system is adapted to allow multiple users to explore the three-dimensional environment and related three-dimensional nodes at the same time (e.g., by viewing the same data from different viewpoints on display screens of different computers, etc.). This may allow the users to review and explore the data collaboratively, independently, repeatedly, etc.

The system may be adapted to allow a user to record the display of the user's display screen, which presents displayed views of a three-dimensional environment—as the user "moves" through the three-dimensional environment (e.g., virtual, virtual overlaid or superimposed with a real-world environment, etc.). This allows the user to later replay "video" of what the user experienced so the user's experience and related data can be shared with others. One or more users can also reexamine the experience and related data; reproduce a problem in the replay; etc.

The system may be further adapted to allow users to "play back" data (e.g., in the form of streams of data objects or any other suitable form, etc.) from an earlier time period and explore the data in the three-dimensional environment during the playback of the data. This may allow the user (or other users) to explore or re-explore data from a past time period from new perspectives and/or new locations.

The system may also be configured to allow users to view one or more streams of data in real time. In some embodiments, a stream of data as received by a system as described herein comprises at least a portion of unstructured data, which has not been analyzed/parsed/indexed by preceding devices/systems through which the stream of data reaches the system. In such embodiments, the attributes of the various nodes may change over time as the underlying data changes. For example, the size, color, transparency, and/or any other physical attribute (attribute) of a particular node may change as the values of the fields within the underlying data objects change in real time. The user can explore this representation of the data as the user's viewpoint moves relative to the objects. Additional examples of user exploration of data represented in a three-dimensional environment as described herein are described in a related application, U.S. patent application Ser. No. 14/226,511 entitled "DOCKABLE BILLBOARDS FOR LABELING OBJECTS IN A DISPLAY HAVING A THREE-DIMENSIONAL PERSPECTIVE OF A VIRTUAL OR REAL ENVIRONMENT" (which claims priority of Provisional Application Ser. No. 61/860,882, filed Jul. 31, 2013) by ROY ARSAN, ALEXANDER RAITZ, CLARK ALLAN, CARY GLEN NOEL, filed on even date herewith, the entire contents of which are hereby incorporated by reference as if fully set forth herein.

As described in greater detail below, the system may be used to graphically represent data from any of a variety of sources in displayed views of the three-dimensional environment. Such sources may include, for example, data from a traditional database, from a non-database data source, from one or more data structures, from direct data feeds, or from any suitable source.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

As discussed above, a computer system, according to various embodiments, is adapted to allow a user to view three-dimensional representations of data objects within a 3D environment from a first person perspective (e.g., on a two or three-dimensional display screen, on any other suitable display screen, etc.). The system may be configured to allow the user to interact with the data objects by freely and dynamically moving a virtual camera through the 3D environment. This may provide the user with a clearer understanding of the data objects and the relationships between them. In particular embodiments, the data objects are updated dynamically in real time so that the user may visually experience changes to the data objects as the changes occur over time.

Below is a more detailed discussion of systems and methods according to various embodiments. The discussion includes an overview of both an example system architecture and the operation of a Setup Module and a Display Module according to various embodiments.

FIG. 1 is a block diagram of a System 100 according to a particular embodiment. As may be understood from this figure, the System 100 includes one or more computer networks 145, a Data Store 140, a Data Display Server 150, and one or more remote computing devices such as a Mobile Computing Device 120 (e.g., a smart phone, a tablet computer, a wearable computing device, a laptop computer, etc.). In particular embodiments, the one or more computer networks 145 facilitate communication between the Data Store 140, Data Display Server 150, and one or more remote computing devices 120, 130.

The one or more computer networks 145 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers, etc.). The communication link between the Data Store 140 and Data Display Server 150 may be, for example, implemented via a Local Area Network (LAN) or via the Internet.

As will be understood in light of the discussion below, the various steps described herein may be implemented by any suitable computing device, and the steps may be executed using a computer readable medium storing computer executable instructions for executing the steps described herein. For purposes of the discussion below, various steps will be described as being executed by a Setup Module and a Display Module running on the Data Display Server 150 of FIG. 1. An example structure and functionality of the Data Display Server 150 are described below in reference to FIG. 10.

Returning to FIG. 1, in various embodiments, the Data Display Server 150 or other suitable server is adapted to receive and store information in the Data Store 140 for later use by the Data Display Server. This data may, for example, be received dynamically (e.g., as a continuous stream of data, etc.) or via discrete transfers of data via the one or more networks 145, or via any other suitable data transfer mechanism. The Data Display Server 150 may then use data from the data store 140 in creating and displaying the three-dimensional representations of the data discussed below.

3. Setup Module

In various embodiments, before the data display server 150 displays information to a user, a suitable individual defines a correlation between various fields of a particular data object and one or more attributes of a particular three-dimensional node that is to represent the data within those fields. FIG. 2 shows an example table that lists the relationships between the respective fields and their corresponding attributes. In some embodiments, these relationships can be generated or updated by a user with a single command at a command line interface, with a script, etc. This single command, script, etc., can be modified by the user dynamically to generate updates and changes to displayed views of the three-dimensional environment while these displayed views based at least in part on these relationships are being rendered. In this example, the data object has been set up to specifically include 3D-related fields (width, height, color, etc.) for use in generating a suitable three-dimensional node to represent the data within the data object.

The table in FIG. 2 shows, for example, that the value of the field "width" will determine the width of a node that is in the form of a rectangular box, that the value of the field "height" will determine the height of the node, and that the value of the field "depth" will determine the depth of the node. In this example, the field name will be used to populate the text within a banner to be displayed adjacent the node and any cluster designators that correspond to the node. In various embodiments the values of these attributes may change as the underlying data within the fields of the node changes, which may cause the appearance of the node in one or more displayed views of the three-dimensional environment to change dynamically on the user's display. The amount or ways in which an attribute of a 3D object changes as the underlying data that it represents changes may occur according to a mapping or scale that may be defined by the user.

In particular embodiments, the setup module may also allow the user to set up the user's desired interface for navigating a three-dimensional display of data within various data objects (e.g., via a sequence of displayed views of the three-dimensional environment based on a sequence of combinations of locations and perspectives of a virtual "camera," etc.). For example, a user may indicate that the user wishes to use various keys on a keyboard to move a virtual "camera" in three dimensions relative to the three-dimensional environment. The system may, for example, allow a user to specify particular keys for moving the camera forward, backward, to the left and to the right within a virtual three-dimensional environment. The system may also allow the user to specify particular keys for panning the camera from left to right, to adjust the height of the camera, and to control the movement of the camera in any other suitable manner, using any other suitable peripheral device (e.g., a mouse, a joystick, a motion sensor, etc.).

Similar techniques, such as those described above, may be used to map any particular type of data delivered in any suitable format. As a particular example, in an example in which the system is to receive a continuously updating real-time data feed from a particular sensor (e.g., a temperature sensor, other sensors, etc.), the setup module may allow a user to specify how the user wishes the data to correspond to one or more attributes of a particular three-dimensional object (e.g., as the height or width of a particular three-dimensional vertical prism, etc.) represented in the three-dimensional environment. This same technique may be used to map multiple different types of data to different attributes of a single three-dimensional object; for example, the height of a prism may correspond to a current value of a first sensor reading (or other variable) and the depth of the same prism may correspond to a current value of a second sensor reading.

4. Display Module

Figure 3A:
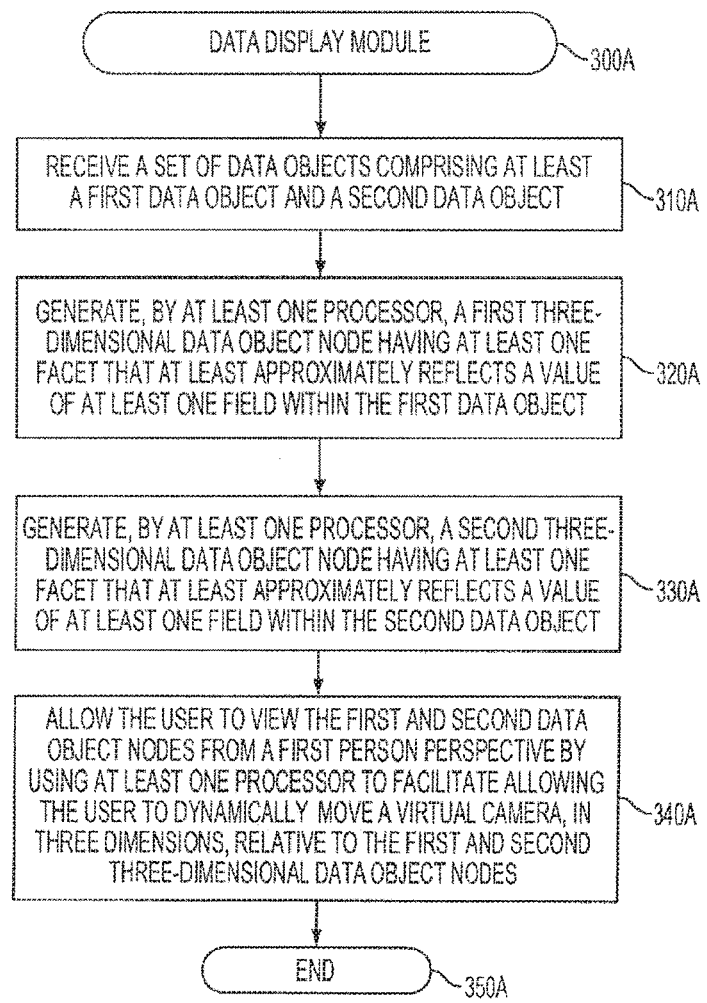
FIG. 3A and FIG. 3B depict flow charts that generally illustrate various steps executed by a data display module and a display module, respectively, that, for example, may be executed by the Data Display Server of FIG. 1.
Figure 3B:
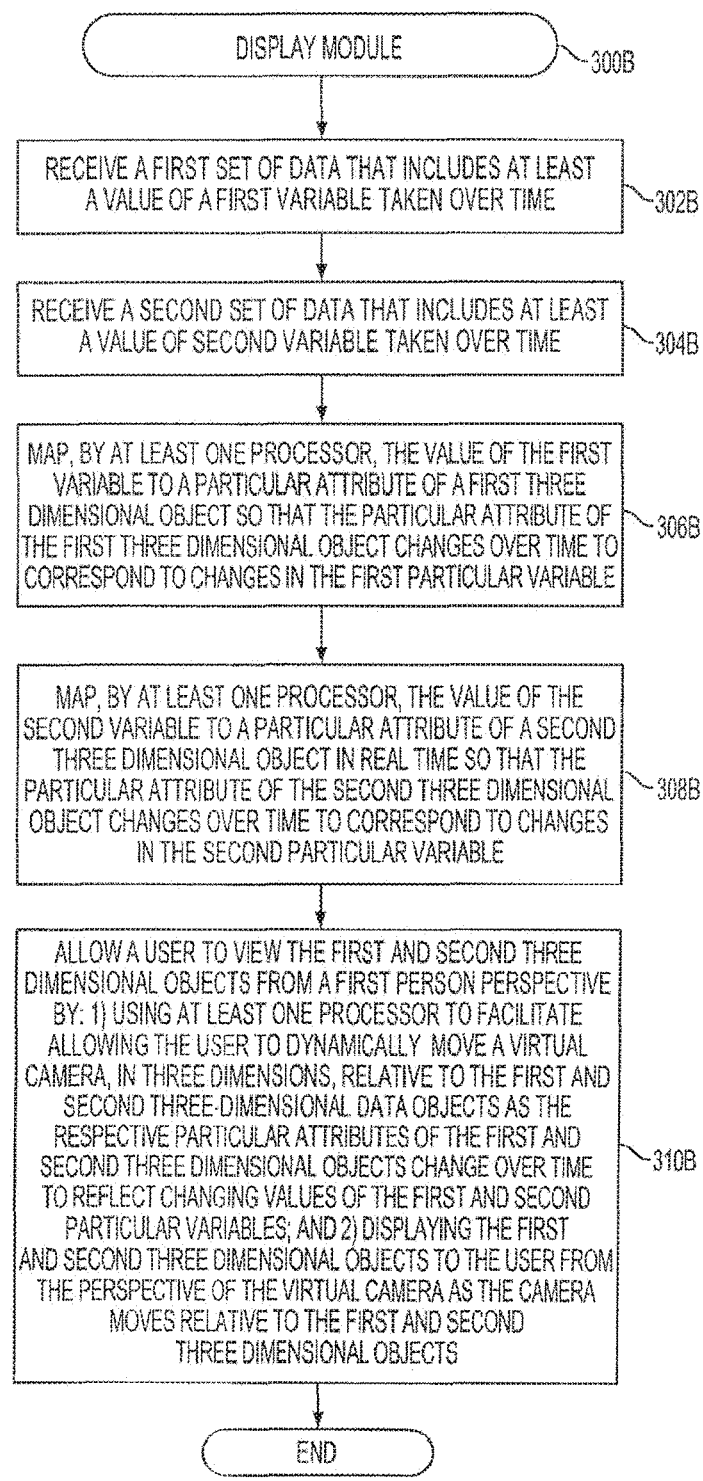

In particular embodiments, once the system is properly set up, the system may execute a display module to create and display three-dimensional representations of data, such as data from the system's data store 140. A sample, high-level operation of the data display module 300 is shown in FIG. 3. As shown in this Figure, when executing this module, the system begins at Step 310A by receiving a set of data objects comprising at least a first data object and a second data object. Next, at Step 320A, the system generates a first three-dimensional node having at least one attribute that at least approximately reflects a value of at least one field within the first data object.

The system may generate the first-three-dimensional node by, for example, using a suitable scale for the at least one attribute to convey the value of the at least one field within the first data object. For example, where the value conveyed by the attribute is a first percentage (e.g., a percentage of CPU usage, etc.), the system may be configured to generate the three-dimensional node with an attribute (e.g., such as height, length, width, depth, etc.) where the attribute has a dimension based at least in part on a maximum dimension. When generating the three-dimensional node, the system may generate the attribute where the attribute has a dimension that is the first percentage of the maximum dimension. In other embodiments, where the value is a particular value, the system may generate an attribute with a dimension based, at least in part, on the particular value's relation to a maximum for that value (e.g., by converting the particular value to a percentage of the maximum, etc.).

As a particular example, a particular three-dimensional node may have a height attribute that represents a CPU usage of a particular software program (e.g., a system process, a user process, a database process, a networking process, etc.) represented by the particular three-dimensional node. When generating the particular three-dimensional node, the system determines a suitable height for the particular three-dimensional node based at least in part on the CPU usage and a maximum height for three-dimensional data objects. The maximum height for three-dimensional data objects may include any suitable maximum height, such as, for example, a particular number of pixels, a particular distance within the 3D environment, etc. The maximum height may be provided by a user of the system, or a suitable maximum height may be determined by the system. In this example, if the suitable maximum height were 200 pixels and the CPU usage were 60%, the system would generate the particular three-dimensional node with a height of 120 pixels. In displayed views of the three-dimensional environment generated by a system as described herein, heights of nodes may change (e.g., plateauing, undulating, rising or descending rapidly, oscillating, etc.) as the underlying CPU usages of software programs change, which may cause the appearance of the nodes to change dynamically on the user's display. In some embodiments, this scaling of attributes may enable a user of the system to relatively easily compare the attributes (e.g., representing CPU usages, etc.) among two or more three-dimensional nodes within the 3D environment, quickly identify (e.g., possible anomaly, etc.) software programs that are over-consuming CPU usages over a period of time, etc.

As another particular example of three-dimensional node generation, the system may generate a three-dimensional node with a color attribute that corresponds to CPU usage. When generating the three-dimensional node, the system may assign a color based at least in part on the CPU usage and a suitable color scale. For example, the color of the three-dimensional data object mode may indicate whether the CPU usage is low, medium, or high at that point in time. For example, the color of the three-dimensional node may be displayed as: (1) green when the CPU usage is 15% or less; (2) yellow when the CPU usage is between 15% and 50%; and (3) red when the CPU usage is 50% or more. In some embodiments, the system may utilize a color scale for the color attribute that includes a particular color at various levels of saturation. For example, the system may generate a three-dimensional node that is: (1) red with a high saturation for high CPU usages (e.g., CPU usages above 70%, etc.); (2) red with a medium saturation for medium CPU usages (e.g., CPU usages between 30% and 70%, etc.); and (3) red with a low saturation for low CPU usages (e.g., CPU usages below 30%, etc.). In such embodiments, the use of varying saturation for the color attribute in one or more displayed views of the three-dimensional environment that includes the three-dimensional node may enable a user of the system to substantially easily ascertain the CPU usage for the data represented by the three-dimensional node based on the saturation of the three-dimensional node's color.

Returning to Step 330A, the system proceeds by generating a second three-dimensional node having at least one attribute that at least approximately reflects a value of at least one field within the second data object. The system then advances to Step 340A, where it allows the user to view the first and second nodes from a first person perspective (e.g., from finite distances that are dynamically changeable by the user, etc.) in a three-dimensional environment by facilitating allowing the user to dynamically move a virtual camera, in three dimensions, relative to the first and second three-dimensional nodes. A suitable three-dimensional environment and various example three-dimensional nodes are discussed in greater detail below.

5. Example Three-Dimensional Environments

Several example three-dimensional environments are shown in FIG. 4 through FIG. 8. As may be understood, for example, from FIG. 4, a suitable three-dimensional environment may be displayed as a three-dimensional projection (e.g., a displayed view, etc.) in which three-dimensional points from the environment are mapped into a two-dimensional plane. As may be understood from this figure, the three-dimensional environment may include a three-dimensional reference surface (in this case a checkered floor 405) and a light source (not shown) to enhance the three-dimensional effect of the display. In some embodiments, the three-dimensional environment, the three-dimensional reference surface therein, may comprise one or more spatial (e.g., geographical, topological, topographic, etc.) features or layouts other than, or in addition to, a flat or planar surface. In some embodiments, the three-dimensional environment may comprise one or more of computer-generated images, photographic images, 2D maps, 3D map, 2D or 3D representation of the physical surrounding of a user, a 2D or 3D representation of business facilities, data centers, server farms, distribution/delivery centers, transit centers, stadiums, sports facilities, education institutions, museums, etc.

In some embodiments, a system as described herein can be configured to overlay or superimpose 2D and 3D displayed views, nodes, cluster designators, graphic objects, etc., perceptually with a real-world environment. In some embodiments, these displayed views, nodes, cluster designators, graphic objects, etc., can be rendered in a manner that they are overlaid or superimposed with entities these displayed views, nodes, cluster designators, graphic objects, etc., represent.

In an example, while a user is walking in a data center, a portable computing device, a wearable device, etc., with the user may render 2D and 3D displayed views, nodes, cluster designators, graphic objects, etc., representing computers, hosts, servers, processes, virtual machines running on hosts, etc., at specific coordinates (e.g., x-y-z coordinates of a space representing the three-dimensional environment, etc.) of the user's real-world environment at the data center; the specific coordinates of the 2D and 3D displayed views, nodes, cluster designators, graphic objects, etc., may correspond to locations of the represented computers, hosts, servers, computers hosting processes or virtual machines in the data center.

In another example, while a user is walking in Times Square, New York, a wearable computing device may render 2D and 3D displayed views, nodes, cluster designators, graphic objects, etc., at specific coordinates (e.g., x-y-z coordinates of a space representing the user's real environment, etc.) of the user's real-world environment at Times Square, for example, as if the 2D and 3D displayed views, nodes, cluster designators, graphic objects, etc., are a part of the user's real-world environment.

In some embodiments the three-dimensional environment is rendered using a three-dimensional perspective on a two-dimensional display, and it may be rendered and explored similar to the way a game player might navigate a first-person shooter videogame (e.g., using keyboard controls to navigate the three-dimensional environment). In some embodiments, the three-dimensional environment may be rendered in three dimensions using, for example, a virtual reality display (such as the Oculus Rift), holograms or holographic technology, a three-dimensional television, or any other suitable three-dimensional display.

In various embodiments, the system is configured to enable one or more users to move within the 3D environment by controlling the position of the virtual camera as described above. In various embodiments, the user-controlled virtual camera provides the perspective from which the system is configured to display the 3D environment to the user. As discussed above, the system may be configured to enable the user to adjust the position of the virtual camera in any suitable manner (e.g., using any suitable input device such as a keyboard, mouse, joystick etc.).

Use of keyboard input to navigate a simulated 3D environment rendered on a 2D display is known in the context of first-person shooter video games but has heretofore not been used for the purposes of navigating a 3D environment where 3D objects are used for visualizing a stream of data (or real-time data). Such an application is contemplated by the inventors and included in the present invention.

6. Nodes

Figure 4:
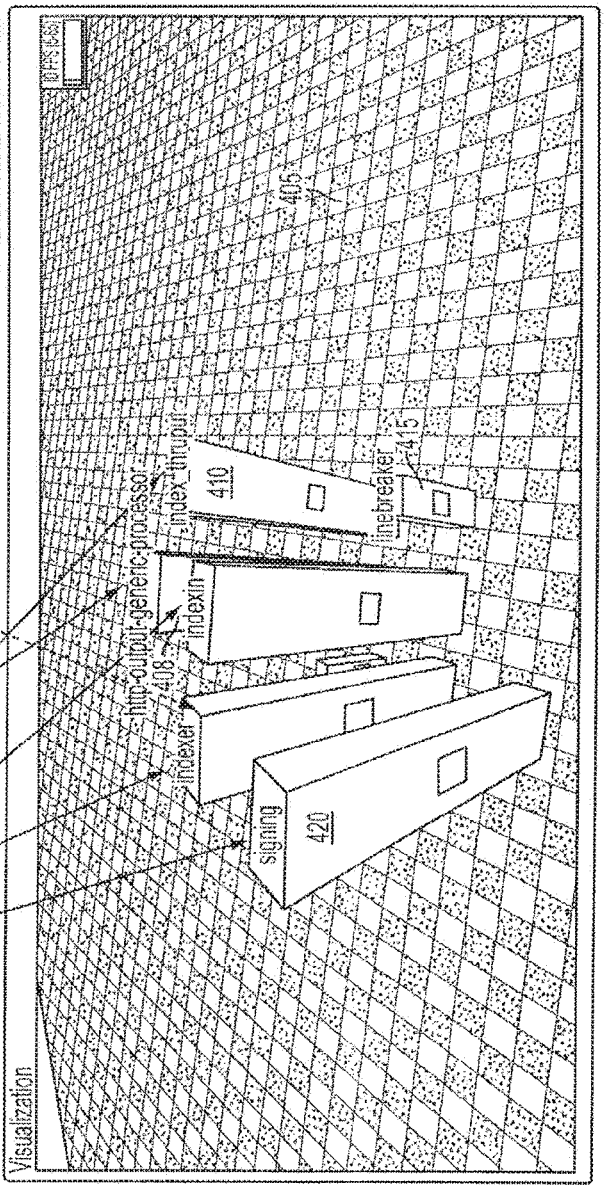
FIG. 4 is a screen display showing example nodes and the data to which the nodes correspond.

Still referring to FIG. 4, the three-dimensional display may include a plurality of nodes 410, 415, and 420 that serve as a three-dimensional representation of the data within a particular data object. As discussed above, one or more of the various attributes of the nodes may be chosen to reflect a value of a particular data field within the data object. For example, if the node is a rectangular prism that corresponds to a data object that indicates the usage, by a particular computer application, of a particular computer's resources: (1) the size of the prism may correspond to the percentage of the system's memory that the application is using at a particular point in time; and (2) the color of the prism may indicate whether the application is using a small, medium, or large amount of the system's memory at that point in time. For example, the color of the prism may be displayed as: (1) green when the application is using 15% or less of the system's memory; (2) yellow when the application is using between 15% and 50% of the system's memory; and (3) red when the application is using is using 50% or more of the system's memory. In this case, the fact that a particular sphere is red is intended to alert a user to the fact that the application to which the sphere corresponds is using an unusually large amount of the system's memory.

It should be understood that any suitable attribute may be used to represent data within a particular data object. An attribute of a 2D or 3D object can be rendered by a system as described herein in one or more displayed views of a three-dimensional environment as a visually (and/or audibly) perceivable property/feature/aspect of the object. Examples of suitable visualized three-dimensional attributes may include, for example, the node's shape, width, height, depth, color, material, lighting, top textual banner, and/or associated visual animations (e.g., blinking, beaconing, pulsating, other visual effects, etc.).

Figure 6:
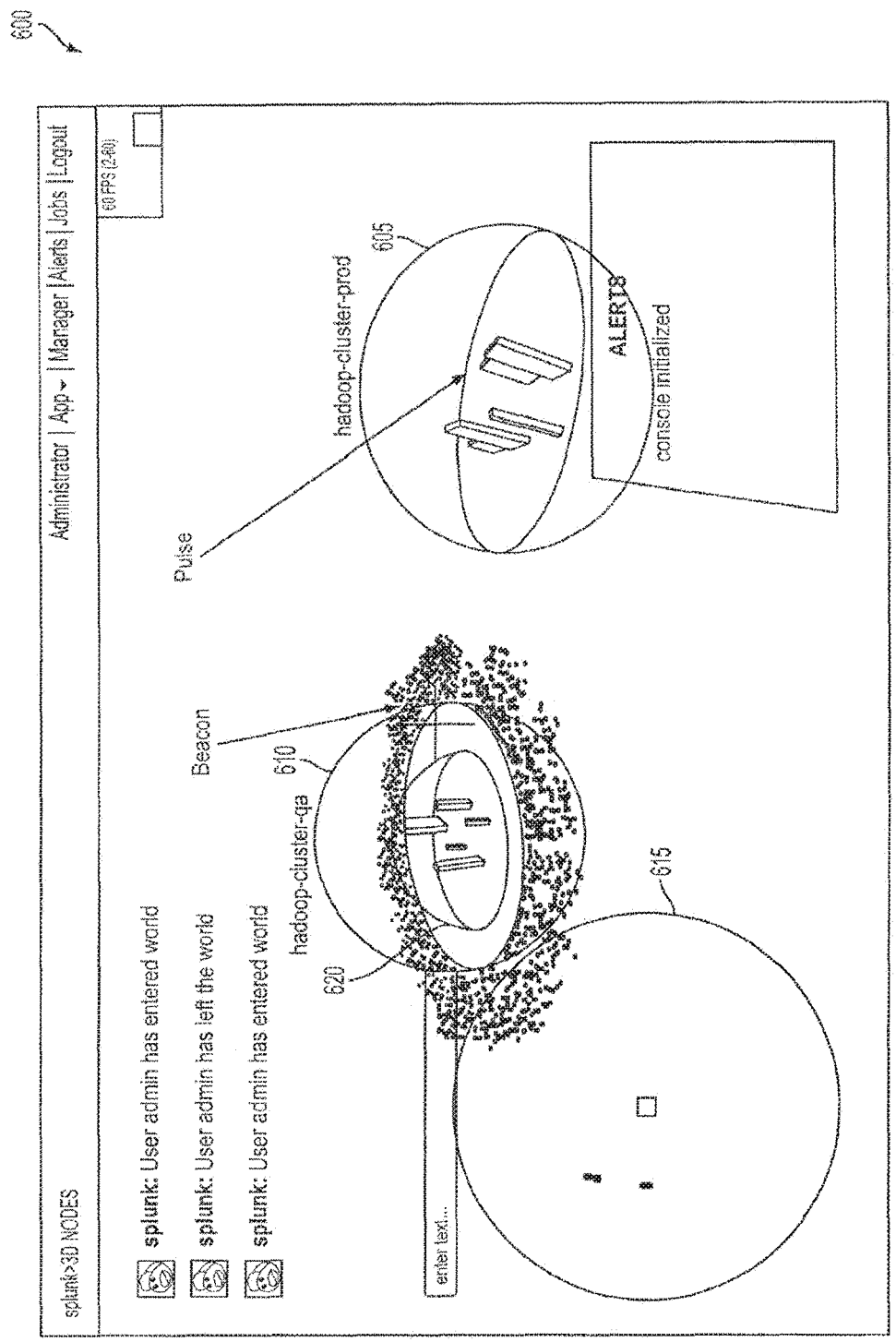
FIG. 6, FIG. 7 and FIG. 8 are screen displays of example interfaces which users may use to access the system.

In some embodiments, time-varying visual effects, such as beaconing (e.g., an effect of light emitting outwards from a 2D or 3D object, etc.), pulsating, etc., can be used in visual animations of one or more 2D or 3D objects (e.g., cluster designators, nodes, etc.). FIG. 6 depicts examples of beaconing and pulsating that can be used in displayed views of a three-dimensional environment as described herein.

In an example, a cluster designator of a particular level may comprise a number of lower level clusters or nodes that may perform a type of activity such as messaging, interne traffic, networking activities, database activities, etc. Based on states, measurements, metrics, etc., associated with or indicative with the intensities of the type of activities, the cluster designator may be depicted in the three-dimensional environment as beaconing particular colors (e.g., red, yellow, mixed colors, etc.) outwardly from the cluster designator. The frequency of beaconing can be made dependent on the intensities of the type of activities (e.g., beaconing quickens when the intensities are relatively high and slows even to no variation when the intensities are relatively low, etc.).

In another example, a cluster designator of a particular level may comprise a number of lower level clusters or nodes; a particular lower level cluster or node among them may be relatively significant among the lower level clusters, in relative critical state, etc. Based on states, measurements, metrics, etc., associated with the particular lower level cluster or node, the cluster designator may be depicted in the three-dimensional environment with the particular lower level cluster or node visually pulsating (e.g., with time varying lights, sizes, textures, etc.) inside the cluster designator. The frequency of pulsating can be made dependent on the states, measurements, metrics, etc., associated with the particular lower level cluster or node (e.g., pulsating or glowing quickens when an alert state becomes relatively critical and slows even to no pulsating or glowing when the alert state becomes relatively normal, etc.).

In various embodiments, different time varying visual effects (e.g., color changes, brightness changes, visual size changes, spatial direction changes, visible motions, oscillations, etc.) can be used to depict measurements, metrics, states, etc., of components as represented in a three-dimensional environment as described herein. Thus, techniques as described herein can be used to easily and efficiently visualize, explore, analyze, etc., various types, sizes or portions of data (e.g., real time data, big data, stored data, recorded data, raw data, aggregated data, warehoused data, etc.).

Attributes may also include non-visual data, such as audio that is associated with the node (e.g., that is played louder as the camera approaches the node and is played more softly as the camera moves away from the node, etc.).

In various embodiments, a data display can be rendered by a system as described herein to display the current value of one or more fields within a data object on a node (or other node) associated with the data object. In particular embodiments, the system may be configured to allow a user to interact with the node (e.g., within a three-dimensional environment, etc.) to change which of the particular field values that are displayed on the node.

7. Cluster Designators

Figure 5:
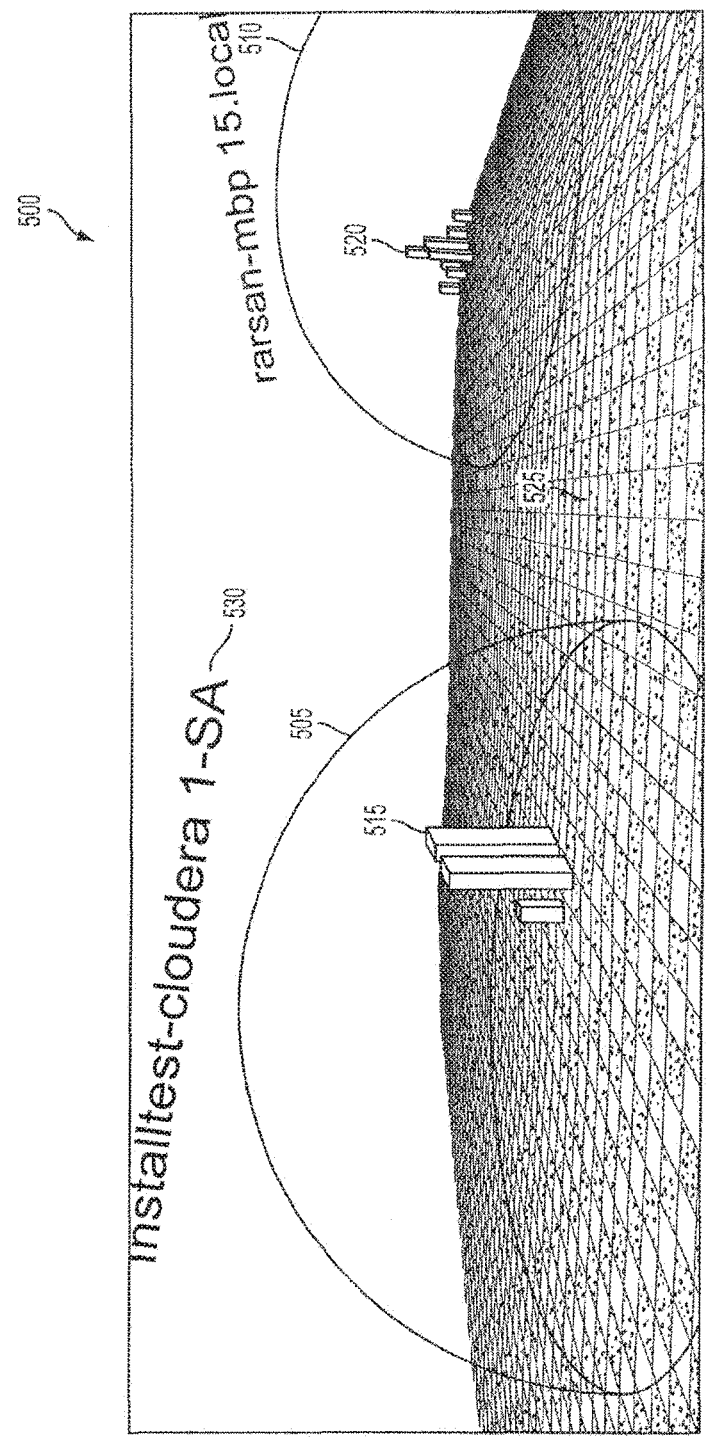
FIG. 5 is a screen display depicting example cluster designators.

As shown in FIG. 5, in various embodiments, the system is adapted to display one or more cluster designators 505, 510 that each correspond to a respective set of related nodes 515, 520 that are positioned proximate each other in a cluster. Examples of two nodes proximate to each other may include, but are not limited to only: the two nodes locating within a finite contiguous region, a region of a finite radius, a building, a city, etc. as represented in displayed views of the three-dimensional environment. Each cluster designator 505, 510 may help a user to quickly identify its corresponding group of related nodes 515, 520 as a discrete group of nodes. For example, the system may display a particular group of nodes 515 on a virtual "floor" 525 within the three-dimensional environment and display a semi-transparent dome shaped cluster designator 505 adjacent and over the group of nodes 515 so that the cluster designator 505 encloses all of the nodes 515. The system may also display text 530 on or adjacent the dome that indicates the name of the group of nodes 515 (in this case "installtest-cloudera 1-SA").

In particular embodiments, each node within a group of clusters includes an attribute that reflects the same type of data as other nodes within the clusters. For example, the respective height of each node within a particular group (cluster) of nodes may correspond to an average interrupts/second value for a respective processor over a predetermined trailing period of time.

It should be understood that cluster designators may take a variety of different forms. For example, cluster designators may take the form of any suitable three-dimensional object that is positioned adjacent a group of related nodes to spatially or otherwise indicate a group relationship between the nodes, such as a rectangle, a sphere, a pyramid, a cylinder, etc.

As noted above, the system may be adapted to modify the appearance of a particular node to an alert configuration to alert users that a value of one or more fields of the data object that corresponds to the node is outside a predetermined range and/or requires immediate attention. In particular embodiments, the system accomplishes this by changing the value of one or more attributes that are mapped to the node to an alert configuration. In particular embodiments, the system may be configured to modify the appearance of a particular cluster designator 505, 510 to alert users that one or more nodes 515, 520 within the cluster designator 505, 510 are in an alert status. For example, the system may change the color of the cluster designator to red if any of the nodes within the cluster designator turns red to indicate an alert (or in response to any other attribute of the nodes within the cluster designator changing to an alert configuration). This is helpful in drawing the user's attention first to the cluster designator 505, 510 that contains the node of immediate concern, and then to the node itself.

In particular embodiments, once the value of the data within the data object of interest returns to normal, the color of the related node returns to a non-alert color. The color of the cluster designator 505, 510 will also return to a non-alert color assuming that no other nodes 515, 520 within the cluster designator are in alert status.

As shown in FIG. 6, in particular embodiments, a second-level cluster designator 605 may be used to contain multiple cluster designators. This may serve to help a user quickly identify and reference groups of cluster designators. For example, the system may display a semi-transparent sphere-shaped second-level cluster designator 605, 610, 615 adjacent multiple first-level cluster designators (such as the dome-shaped nodes discussed above) so that the second-level cluster designator encloses each of the first-level cluster designators and any nodes within the first-level cluster designators. The system may also display text on or adjacent the sphere that indicates the name of the group of cluster designators. In particular embodiments, the system may be configured to modify the appearance of a particular second-level cluster designator (in the manner discussed above in regard to first-level cluster designators) to alert users that one or more first-level cluster designators and/or nodes within the second-level cluster designator are in an alert status, or that other predetermined criteria are satisfied (e.g., more than a threshold number of first-level clusters or nodes within the second-level cluster satisfy certain criteria, such as currently being in alert status, etc.).

8. Hierarchies of Components

A cluster designator of a particular level (e.g., first-level, second-level, etc.) as described herein may be used to capture one or more of a variety of relationships in nodes, groups of nodes, lower level cluster designators, etc. In some embodiments, nodes in a three-dimensional environment as described herein may be used to represent a variety of components at various levels of a hierarchy of components that are related in a plurality of relationships. For example, a virtual machine may be a component of a first-level running on a host of a second-level (e.g., a level higher than the level of the virtual machine, etc.), which in turn may be included in a host cluster of a third level (e.g., a level higher than the levels of both the host and the virtual machine, etc.). A virtual center may, but is not limited to only, be at a fourth level (e.g., a level higher than the levels of the host cluster, the host and the virtual machine, etc.), may include one or more of cloud-based components, premise-based components, etc. A component in the virtual center may, but is not limited to only, be a host cluster.

In some embodiments, an attribute of a node or a cluster designator representing a higher level component can depend on one or more of data fields, measurements, etc., of (e.g., lower level, etc.) components included in (or related to) the higher level component; one or more attributes of (e.g., lower level, etc.) nodes or clusters representing components included in (or related to) the higher level component; algorithm-generated values, metrics, etc., computed based on one or more data fields of (e.g., lower level, etc.) components included in (or related to) the higher level component; etc.

Examples of attributes of a (e.g., high level, low level, etc.) component may include, but is not limited to only, a state indicator (e.g., a performance metric, a performance state, an operational state, an alarm state, an alert state, etc.), metric, etc. The state indicator, metric, etc., can be computed, determined, etc., based at least in part on data fields, algorithm-generated values, metrics, etc., of the component. The state indicator, metric, etc., can also be computed/determined based at least in part on data fields, algorithm-generated values, metrics, etc., of lower level components included in (or related to) the component, etc. Examples of data fields, algorithm-generated values, metrics, etc., may include, without limitation, measurements, sensory data, mapped data, aggregated data, performance metrics, performance states, operational states, alarm states, alert states, etc.

In some embodiments, states of a particular type (e.g., an alert state type, etc.) of lower level components can be reflected in, or propagated from the lower level components to, a state of the same type in a higher level component. In some embodiments, a state of a component can be computed/determined (e.g., via a state determination algorithm, etc.) by zero, one or more data fields of the component and states of zero, one or more components (e.g., included in the component, related to the component, etc.) immediately below the component in the hierarchy of components. In some embodiments, initially, states of leaf nodes (each of which does not comprise other components from the hierarchy) are first computed/determined/assigned. Then states of (e.g., non-leaf, etc.) components (each of which includes at least one other component in the hierarchy of components) immediately above the leaf nodes can be computed/determined. Such state computation/determination of states of components in the hierarchy of components can be performed repeatedly, iteratively, recursively, breadth-first, depth-first, in compliance with dependence relationship as represented in the hierarchy of components, etc.

Thus, when a high level displayed view of a three-dimensional environment shows that a cluster designator or a node representing a high level component (e.g., a virtual center that comprises numerous host clusters, hosts, virtual machines, processes, etc.) has an attribute (e.g., red color, etc.) indicating an alert state, even if the displayed view either does not or only partially represent a lower level component (e.g., a specific host cluster, a specific host, a specific virtual machine, a specific process, etc.) from which the alert state of the high level component originates, a user viewing the high level displayed view can readily and visually infer that the high level component has at least an alert either at the high level component or one or more lower level component beneath and included in (or related to) the high level component.

In some embodiments, the high level displayed view as mentioned above is a view of the three-dimensional environment as viewed by the user with a specific perspective at a specific location as represented (e.g., using a virtual camera with the same specific perspective at the same specific location, etc.) in the three-dimensional environment. The user as represented in the high level displayed view of the three-dimensional environment may have a first finite distance to the high level cluster designator or node that has the indicated alert state.

In various embodiments, a system as described herein can be configured to change, based on one or more of user input or algorithms, the user's (or the virtual camera's) location or perspective as represented in a three-dimensional environment; for example, the user's location or perspective in the three-dimensional environment can be changed by the system (e.g., in real time, in playback time, in a review session, etc.) through one or more of continuous motions, discontinuous motions, GUI-based pointing operations, GUI-based selection operations, via head tracking sensors, motion sensors, GPS-based sensors, etc. A displayed view of the three-dimensional environment at a specific time point is specific to the user's location and perspective as represented in the three-dimensional environment at the specific time. Since the user's location and perspective as described herein are dynamically changeable by the user and/or the system, a displayed view of the three-dimensional environment as described herein may or may not be a pre-configured view of data such as an isometric view of a data chart (e.g., a preconfigured view of a user with a fixed location or perspective such as from infinity, etc.). Furthermore, a system as described herein can be configured to allow a user to explore data objects through representative cluster designators and/or nodes with any location (e.g., at any finite distance, etc.) or perspective (e.g., at any spatial direction in a three-dimensional environment, etc.).

In other approaches that do not implement techniques as described herein, GUI data displays such as scatterplots, charts, histograms, etc., are based on predefined and preconfigured mappings between data and GUI objects by developers/vendors/providers of the GUI data displays. Other GUI elements such as background images, layouts, etc., are also typically predefined and preconfigured by developers/vendors/providers of the GUI data displays. Thus, an end user is limited to fixed locations and perspectives (e.g., isometric, predefined, preconfigured, from infinity, etc.) that have been predefined and preconfigured by developers/vendors/providers of the GUI data displays.

In contrast, displayed views of a three-dimensional environment as described herein can be generated according to locations and perspectives as determined by a user when the user is exploring the three-dimensional environment with the displayed views. The user can choose to move in any direction over any (e.g., finite) distance at any rate (e.g., constant motion, non-constant motion, discontinuous jumping from one location to another location, etc.) in the three-dimensional environment.

In some embodiments, a system as described herein is configured to provide a simple command input interface for a user to enter a search command, which can be used by the system to drive (e.g., on the fly, etc.) rendering of displayed views of a three-dimensional environment. The command input interface may, but is not limited to, be GUI based, command line based, separate window, in a separate designated portion of a GUI display that renders displayed views of a three-dimensional environment, etc. The user's search command is dynamically changeable by the user as the user is viewing search results generated in response to the user's search command; comprise data fields, indexes, etc., in a late binding schema that can be used to interpret input data from one or more data sources; and can be used by the system to map various data fields, algorithm generated values, etc., to attributes (e.g., facets, dimensions, colors, textures, etc.) of cluster designators or nodes in displayed views of the three-dimensional environment; etc.

In the present example, the user or the system can change the location of the user as represented in the three-dimensional environment and obtain one or more views (e.g., along a trajectory chosen by the user, a trajectory programmatically generated by the system, etc.) from the high level displayed view. The user as represented in the one or more views of the three-dimensional environment may have a second finite distance to the high level cluster designator or node that has the indicated alert state.

In some embodiments, to investigate what causes the cluster designator or node representing the high level component in the high level displayed view of the three-dimensional environment to have the attribute (e.g., red color, etc.) of the alert state, a system as described herein can be configured to receive user input which requests for additional information regarding the alert state of the high level component, provide the additional information that indicates whether the alert state is caused by one or more data fields of the high level components or whether the alert state is propagated from lower level components included in the high level component, etc.

In some embodiments, the system can be configured to receive user input—e.g., subsequent to the user receiving additional information that indicates that the alert state is propagated from lower level components included in the high level component, etc.—which specifies that the user wishes to be placed closer to or inside the cluster designator or node representing the high level component, such that lower level components (e.g., immediately below the level of the high level component but not components in the lower level components, etc.) included in the high level component can be rendered with their own attributes in one or more cluster designators or nodes that correspond to the lower level components. In a particular embodiment, the user can simply select the high level cluster designator or node to cause the user to be placed near or inside the cluster designator or node representing the high level component.

In response, the system can be configured to, based on the user input, render the lower level components included in the high level component (e.g., in one or more detailed internal views of the cluster designator or node, etc.) with their corresponding attributes in one or more cluster designators or nodes that correspond to the lower level components. In particular, the user may be placed at second finite distances from a new location and/or a new perspective in the three-dimensional environment to the lower level components. In some embodiments, the system is configured to position the lower level components at their respective x-y-z coordinates in the three-dimensional environment.

An x-y-z coordinate of a cluster designator or node in the three-dimensional environment as described herein is an attribute of the cluster designator or node, and can be determined or set in one or more of a variety of ways. In an example, the x-y-z coordinate of the cluster designator or node representing a component can be set by the system to be close to x-y-z coordinates of other cluster designators or nodes representing other components, when the component is logically or physically close to, or related with, the other components. In another example, the three-dimensional environment may represent a portion of a real-world environment, a real-world space, a real-world spatial region, etc.; an x-y-z coordinate of cluster designator or node representing a component in the three-dimensional environment may be set in relation to the physical location or coordinate of the component in the real-world environment, the real-world space, the real-world spatial region, etc.

In the present example, based on one or more lower level displayed views (e.g., the detailed internal views as mentioned above, etc.), the user can visually determine whether any of the lower level components have an alert state indication (e.g., through a color attribute of a cluster designator or node representing one of the lower level components in the one or more lower level displayed views, etc.), provide further input to the system for the purpose of determining the underlying cause of the alert state. Thus, successive displayed views of the three-dimensional environment at various levels enable the user to filter out components that do not have a particular state and efficiently reach components that do have the particular state. In some embodiments, the system can be configured to receive user input that requests additional displays or actions associated with one or more cluster designators or nodes. For example, the system can be configured to provide raw data, measurements, metrics, data fields, states, etc., of the one or more cluster designators or nodes in one or more GUI components, GUI frames, panels, windows, etc., that may or may not overlay with displayed views of the three-dimensional environment. In some embodiments, the system is configured to provide raw data collected for a component after a limited number of user GUI actions (e.g., no more than three clicks, etc.).

Such investigation of an underlying cause for a particular state (e.g., an alert state, an out-of-service state, a critical alarm state, etc.) can be performed repeatedly, iteratively, recursively, breadth-first, depth-first, in compliance with dependence relationship as represented in the hierarchy of components, etc. In some embodiments, the user can go (e.g., traverse, etc.) back to a previous view and take a different investigative route or trajectory to explore the three-dimensional environment for the purpose of determining the underlying cause for the particular state.

In some embodiments, some or all data (e.g., data fields that are mapped to attributes of cluster designators or nodes, data fields that are used by algorithms to generate values, etc.) are updated, sourced, collected, etc., dynamically in real time (e.g., from data collectors, from data streaming units, from sensors, from data interfaces, from non-database sources, from database sources, etc.) so that the user may visually experience/perceive/inspect changes to the data at least substantially in real time through a number of displayed views of the three-dimensional environment in which the user can explore with locations and perspectives at the user's choosing. For example, data, such as operational states, amount of memory taken by software programs/processes, CPU usages consumed by hosts or virtual machines/monitored processes thereon, etc., collected in real time can be used to update attributes, such as shapes, colors, heights, textures, etc., of cluster designators or nodes representing components to which the collected data pertains.

In some embodiments, a system as described herein can be configured to display one or more views of a three-dimensional environment generated based at least in part on real time collected data to a user, perform one or more of a variety of actions (e.g., as specified by user input, as determined based on algorithms, etc.) relating to components that are represented in the three-dimensional environment, update (e.g., based on newly collected real time data, etc.) the one or more views of the three-dimensional environment to the user, generate new views of the three-dimensional environment to the user, etc.

Examples of actions as described herein include, but are not limited to only, any of: actions performed by an external system external to the system that is rendering views of the three-dimensional environment; actions performed by the same system that is rendering views of the three-dimensional environment, etc. Actions performed by the external system can be invoked through one or more integration points interfacing external systems/devices, based on one or more system implemented workflows/use cases, etc. Actions performed by the same system may include, but are not limited to only, any of: placing a marker/flags/notes on a cluster designator or node, viewing additional information, data tables, data fields, underlying components or entities, etc., relating to one or more components, bringing up additional displayed views, exploring further in the three-dimensional environment, assigning or transferring troubleshooting tasks to one or more other users, etc.

For example, when a user determines that there is a runaway or hang process, an overactive VM, an entity consuming too much resources, etc., that causes an alert state based on one or more displayed views of a three-dimensional environment, the user may select (e.g., pointing, clicking, hovering, tapping, etc.) one or more remedial/follow up actions related to the cause of the alert state. Examples of remedial/follow up actions may include, but are not limited to only, any of: killing a process; restarting/rebooting a host; installing/scheduling a software/system/application upgrade; performing a load balancing in a cluster of hosts/VMs/processors/processes; causing a failover from one active host/VM/processor/process to a backup host/VM/processor/process; manipulating one or more controls of a real-world device, host, VM, processor, process, etc., that is represented in the three-dimensional environment or that has an impact on a component represented in the three-dimensional environment; setting up an alert state/flag/marker of one or more components, nodes, cluster designators, etc., for investigation/exploration/collaboration/auditing/action; etc.

In response to receiving the user's selection of the one or more remedial actions, a system as described herein (e.g., a system that is rendering views of the three-dimensional environment, etc.) can be configured to carry out the one or more remedial actions. In an example, the system communicates with, and request, one or more external systems to carry out at least one of the one or more remedial actions. In an example, the system itself carries out at least one of the one or more remedial actions.

9. Multiple Users

Figure 7:
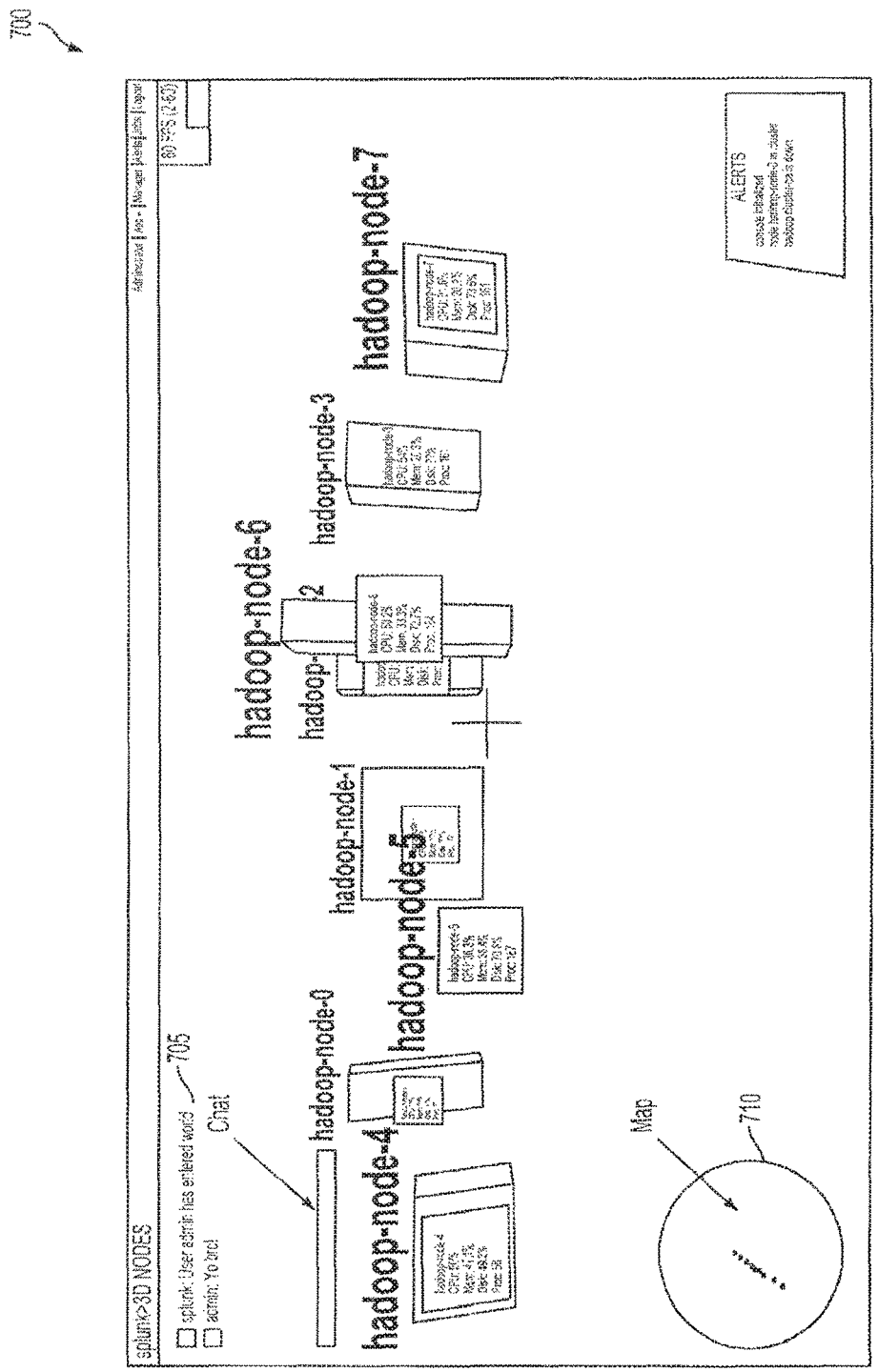

In particular embodiments, the system is adapted to allow multiple users to explore the three-dimensional environment and related three-dimensional nodes at the same time (e.g., by viewing the same data from different viewpoints on display screens of different computers, etc.). This may allow the users to review and explore the data collaboratively. Also, as shown in FIG. 7, in certain embodiments, the system may be adapted to facilitate communication between the users (e.g., via a chat screen 705, etc.) and/or to display the relative positions of the users within the three-dimensional environment on a map 710 of the three-dimensional environment.

In some embodiments, the same three-dimensional environment as described herein can be explored by multiple users represented at the same or even different locations in the three-dimensional environment. For example, the three-dimensional environment may be an environment that represents a first user in Chicago and a second user in San Francisco. The first user and the second user can have their respective perspectives at their respective locations. The first user and the second user can have their own displayed views of the same three-dimensional environment on their own computing devices. At their choosing, the first user and the second user can explore a portion of the three-dimensional environment in a collaborative or non-collaborative manner; exchange their locations or perspectives; exchange messages/information/history with each other; etc.

10. Marking of Nodes

Figure 8:
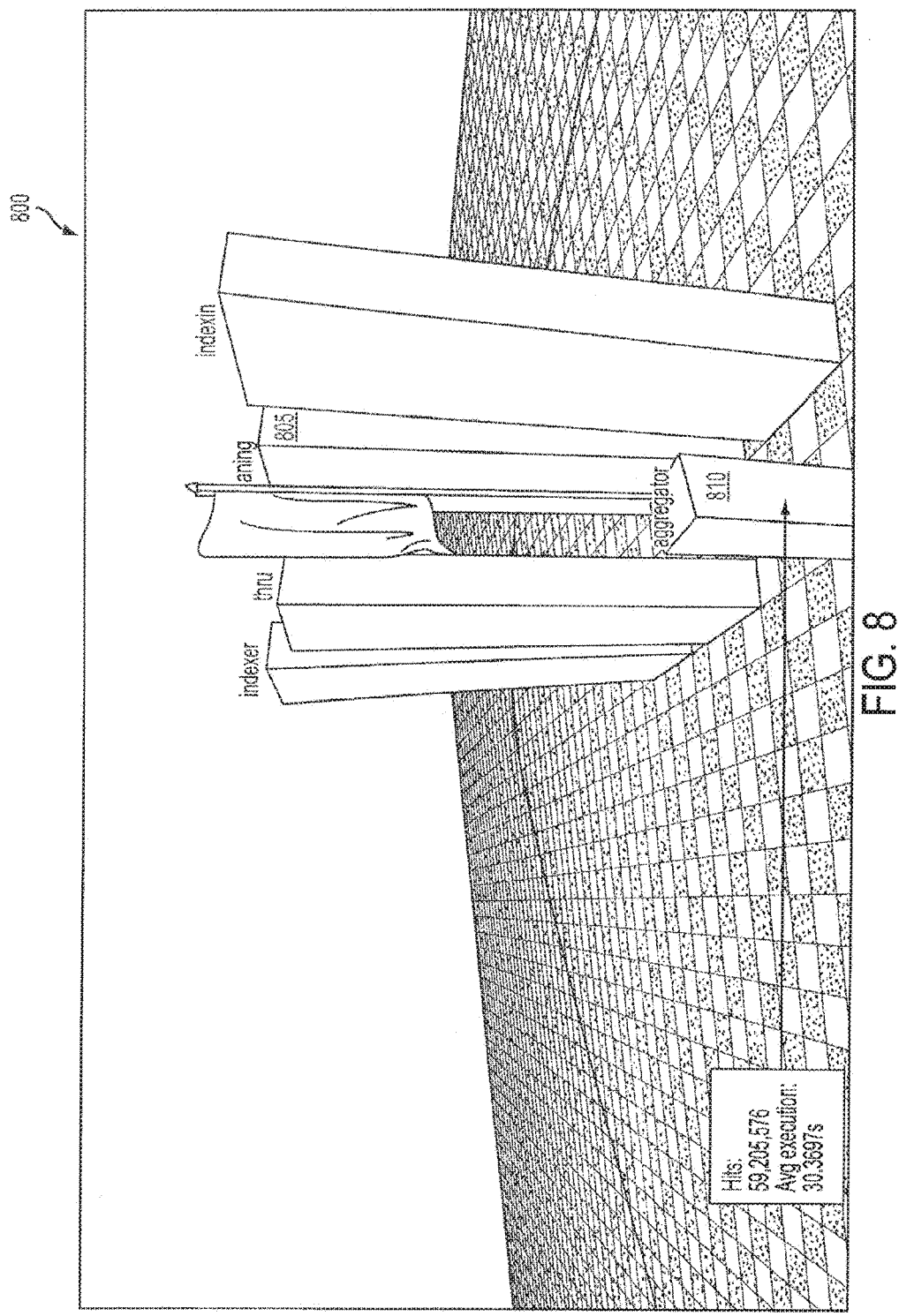

The system may also allow users to mark various nodes or cluster designators by changing, or adding to, the appearance of the nodes. For example, as shown in FIG. 8, the system may be adapted to allow a user to attach a marker, such as a flag 805, to a particular node of interest 810 as the user moves a camera representing the user's viewpoint relative to the particular node of interest 810. This may allow the user, or another user, to easily identify the node 810 during a later exploration of the three-dimensional environment.

11. Record and Playback

The system may be adapted to allow a user to record the displayed views rendered on the user's display screen as the user "moves" through a virtual three-dimensional environment, or as the user moves through a real-world three-dimensional environment superimposed with the virtual three-dimensional environment that comprises visible objects as described herein. This allows the user to later replay "video" of what the user experienced so the user can share the user's experience and the related data with others, and reexamine the experience.

The system may be further adapted to allow users to play back data (e.g., in the form of streams of data objects or any other suitable form, etc.) from an earlier time period and explore the data in the three-dimensional environment during the playback of the data. This may allow the user (or other users) to explore or re-explore data from a past time period from a new perspective.

A history of a user's location and/or the user's perspective as generated by the user's exploration (e.g., via the control of a virtual camera representing the user's location and perspective, etc.) in a three-dimensional environment as described herein may constitute a trajectory comprising one or more time points and one or more of user-specified waypoints, system-generated waypoints, user-specified continuous spatial segments, system-generated continuous spatial segments, as traversed by the user in the three-dimensional environment at the respective time points. The trajectory of the user in the three-dimensional environment can be recorded, replayed (or played back), paused, rewound, fast-forwarded, altered, etc.

A history of underlying data that supports a user's exploration (e.g., via the control of a virtual camera representing the user's location and perspective, etc.) in a three-dimensional environment as described herein may be recorded by a system as described herein. Instead of playing back the user's own history of exploration, the underlying data that supports the user's particular exploration can be explored or re-explored with same or different locations and/or perspectives as compared with those of the user's own history of exploration.

12. Dynamic Nature of Data

The system may also be configured to allow users to view one or more streams of data in real time. In such embodiments, the attributes of the various nodes may change over time as the underlying data within the data objects SPLK0009USC3C1_Applicationchanges. The user may view these dynamic changes as the user's viewpoint changes relative to the nodes within the three-dimensional environment. For example, the size, color, transparency, and/or any other attribute (or combination of attributes) of a particular node may change as the values of the fields within the underlying data objects change in real time.

In various embodiments, the data within various data objects may include statistical information that may represent information about data collected over a discrete period of time. For example, a particular field within a data object may correspond to the average number of failed attempts to log in to a particular web site over the preceding hour. In particular embodiments, the system may allow a user to observe dynamic changes in this average number in real time by observing dynamic changes in the size or shape (or other attribute) of a three-dimensional node that corresponds to the data object. For example, the height of the node may fluctuate in real time as the average number changes.

13. Data Tracing

Figure 9:
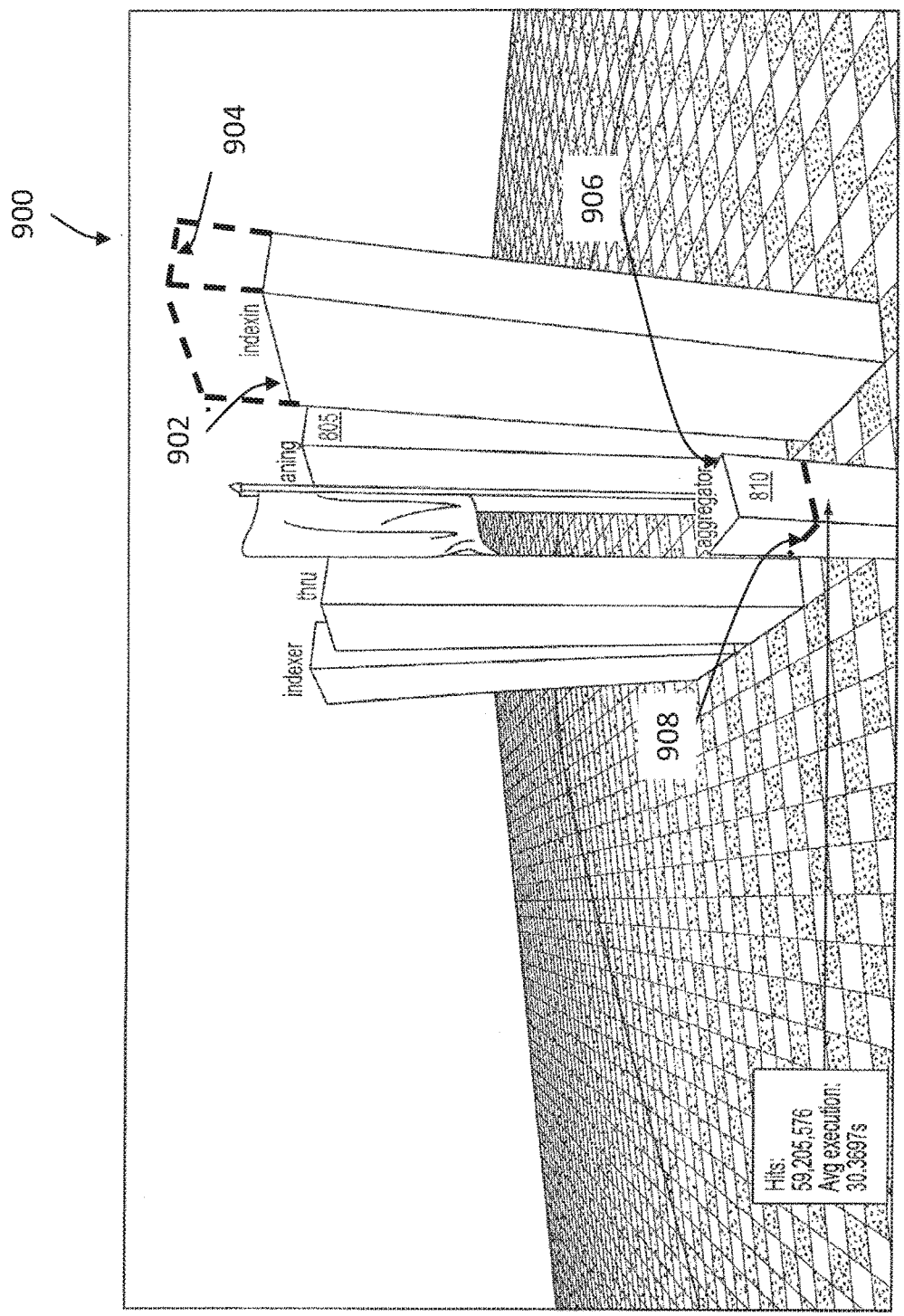
FIG. 9 is an example interface showing a tracing feature of the system.

The system, in various embodiments, may be configured to display past data in addition to substantially current data in a particular node. FIG. 9 depicts an example displayed view 900 of a three-dimensional environment displaying both current (e.g., 902, 906, etc.) and past (e.g., 904, 908, etc.) data for a particular attribute of the node (e.g., denoted as "indexin," "aggregator," etc.). Such a node may comprise a first visual appearance (e.g., a first line style, a first color, a first visual effect, etc.) at least approximately reflect a value of at least one field within a particular data object. For the purpose of illustration only, as shown in FIG. 9, the first visual appearance is a first height (corresponding to 902 or 906 of FIG. 9) as indicated by solid lines. The node may comprise a second visual appearance (e.g., a second line style, a second color, a second visual effect, etc.) at least approximately reflect a value of the at least one field within the data object at a previous time. For the purpose of illustration only, as shown in FIG. 9, the second visual appearance is a second height (corresponding to 904 or 908 of FIG. 9) as indicated by dash lines.

In a particular example, the at least one field within the data object may continuously update its value at a particular time interval (e.g., every minute, every two minutes, or any other suitable time interval). The system may update the particular attribute representing that value and generate a dashed line of a second height representing the prior amount of the value before the value was updated. In various embodiments, the system may be configured to display this dashed line representing the previous value for a particular amount of time (e.g., 15 seconds, 30 seconds, etc.) or until the value is updated again at the next time interval. In some embodiments, displaying this dashed line may enable users to view trends in the data (e.g., whether the value is increasing or decreasing, etc.) and to determine what an immediate change in the value was, and this may also indicate momentary peaks in data that might otherwise be missed (e.g., be imperceptible to a human viewer) if only the current real-time value were on display. In some embodiments, the previous value as indicated by the second visual appearance (e.g., 904 of FIG. 9, etc.) is higher than the current value as indicated by the first visual appearance (e.g., 902 of FIG. 9, etc.). In some embodiments, the previous value as indicated by the second visual appearance (e.g., 908 of FIG. 9, etc.) is lower than the current value as indicated by the first visual appearance (e.g., 906 of FIG. 9, etc.). Thus, a user can immediately tell if the value of a data field has not changed from a previous time, has slowly changed from a previous time, has reached a maximum at a particular time (e.g., by observing an inflection of the dash lines representing the previous value tracing from below the current value to above the current value, etc.), has reached a minimum at a particular time (e.g., by observing an inflection of the dash lines representing the previous value tracing from above the current value to below the current value, etc.), etc.

In various embodiments, the system may be configured to continuously trace one or more attributes of a particular graphical object (e.g., a plurality of attributes, etc.) in the manner described above. For example, the system may trace both a height and a width of a particular graphical object, where height and width correspond to values from different fields within the data object. In other embodiments, the system may be configured to trace any suitable combination of attributes (e.g., length, depth, etc.).

Techniques as described herein can be used in both two-dimensional and three-dimensional object depictions. For example, a first height in a two-dimensional object (e.g., rectangle, etc.) in solid lines can represent a current value of a data field over a sequence of time points, whereas a second height in the two-dimensional object (e.g., rectangle, etc.) in dash lines can represent a previous value of the data field over the same sequence of time points.

The tracer can be depicted in any sort of visual ways that sets it apart. Dashed lines are not the only possibilities. Instead, a different color could be used, or a transparency, or a dotted line, and so on.

The tracer may reflect the previous location of the attribute (which, in turn, represents the highest value reached) during a predetermined time period immediately preceding the present moment. In some embodiments, the tracer only represents maximums above the present value; in other embodiments, the tracer only represents minimums below the present value; in yet other embodiments, the tracer represents both maximum and minimum values reached during the immediately preceding time period. This indicator may be referred to as a tracer because it essentially follows the present value, but lags it by a period of time (which may vary depending on when in the immediately preceding time period the max/min was reached).

14. Example Data Sources

It should be understood that the above techniques may be used to display any suitable type of data to one or more users. Such data may include, for example, data obtained from a database (e.g., in the form of records that each include one or more populated fields of data, etc.), or data (e.g., machine data, etc.) obtained directly (e.g., in real time, etc.) from one or more computing devices or any other suitable source.

It should also be understood that the system may obtain the data in any suitable form and may or may not be processed by the system before the system maps the data to one or more attributes of a three-dimensional object and then displays the three-dimensional object to reflect the data. The system may, for example, receive the data in the form of a live, real-time stream of data from a particular computer, processor, machine, sensor, or other real-world object. The data may be structured or unstructured data. In particular embodiments, the data may be received from a software application.

In a particular embodiment, the system is adapted to: (1) obtain, from a suitable source, unstructured or semi-structured data that comprises a series of "events" that each include a respective time associated with the event (e.g., computer log entries, other time-specific events, etc.); (2) save the data to a data store; (3) create a semi-indexed version of the data in which the events are indexed by time stamp; (4) allow a user to define (e.g., at any time, etc.) a schema (e.g., a late-binding schema where values are extracted at a time after data ingestion time such as search time, etc.) for use in searching the data—the schema may include, for example, the name of one or more particular "fields" (e.g., fields that are previously undefined in the unstructured or semi-structured data, etc.) of data within the events and information regarding where the fields are located within the events (e.g., a particular field of information may be represented as the first ten characters after the second semi-colon in the event, etc.); (5) after the user defines the schema, allowing the user to specify a search of the indexed events; (6) conducting the specified search of the indexed events; and (7) returning the results of the search to the user. In some embodiments, the system is configured to allow one or more users to define or update a schema for unstructured or semi-structured data from a source (e.g., a non-database source, a database source, a data collector, a data integration point, etc.) before, after, or at the same time while, the system stores the unstructured or semi-structured data, derived data from the unstructured or semi-structured data. In some embodiments, at least some definitions (e.g., late-binding definitions, etc.) of a schema as described herein can be applied before, or contemporaneously while, the system is generating search results as a response to receiving a search command/request (e.g., from a user, from another system, from another module of the system, etc.); the generation of the search results may make use of at least some of the definitions (e.g., as being updated, as predefined, etc.) of the schema as changed or updated to interpret, extract, aggregate, etc., the unstructured or semi-structured data from the data source. Examples of definitions in a schema include, but are not limited to only, any of: (e.g., global to users, global to data sources, user-specific, system-specific, data-source specific, etc.) definitions of data fields (e.g., previously undefined data fields by either the source or the system, etc.) in unstructured or semi-structured data, correspondence relationships between data fields in unstructured or semi-structured data and other data fields in the unstructured or semi-structured data, correspondence relationships between data fields in unstructured or semi-structured data and external entities (e.g., one or more attributes of GUI objects in a 2D or 3D environment, one or more actions that can be performed on entities represented in a 2D or 3D environment, etc.), etc.

The technique above may be advantageous because it allows users to: (1) store raw data for use in later searches without having to delete or summarize the raw data for later use, and (2) later decide how best to define a schema for use in searching the data. This may provide a flexible system for searching data from a variety of disparate data sources.

In one embodiment, the system is adapted to receive a stream of data objects at least substantially in real time (e.g., in real time, etc.) and to use the techniques described herein to display data in the fields of the data objects. Such data may include events that have been indexed according to a late-binding schema, as described above, or other suitable data.

15. Example System Operation

An example system for displaying information within a three-dimensional environment may be used in the context of displaying information associated with processors within servers in a data center. In this example, the system may generate a three-dimensional environment that includes various three-dimensional nodes that represent various processors within a particular server. The nodes may be grouped within a particular cluster designator, which may for example, represent the particular server. The particular cluster designator may be further grouped with other cluster designators within a cluster of cluster designators (a second-level cluster designator), where the cluster of cluster designators represents a particular data center that includes a plurality of servers.

In this example, a user may be monitoring the various servers within the data center and, in particular, monitoring the various servers' respective processors. The system may enable the user to view the various nodes within a particular cluster designator in order to ascertain information about the various processors. For example, the nodes may include attributes that reflect data values that are updated every minute (or any other suitable period of time) and represent a sample of data taken over an interval of time spanning the sixty minutes (or other suitable period of time) leading up to the minute at which the data values are updated. For example, the system may update a value of the data at L0AM to reflect a sample of the data from 9 AM-10 AM, may update the data at 10:01 AM to reflect a sample of the data from 9:01 AM to 10:01 AM and so on.

The data represented by the attributes and updated at the intervals discussed immediately above, may include, for example, a percentage of Deferred Procedure Calls (DPCs) time (e.g., a percentage of processor time spent processing DPCs during the sample interval, etc.); a percentage interrupt time (e.g., a percentage of processor time spent processing hardware interrupts during the sample interval, etc.); a percentage of privileged time (e.g., a percentage of elapsed time that a processor has been busy executing non-idle threads, etc.); or any other suitable attribute or data that may be associated with a processor or that may be of interest to a user in relation to the processor.

Each of these data may be represented by any suitable attribute of the three-dimensional node for the particular processor. These attributes may include, for example, height, color, volume, or any other suitable attribute discussed above. In this example, the system may enable to the user to navigate through the 3D environment to view the various three-dimensional nodes within the various server cluster designators in order to monitor the servers and the processors within the data center.

16. Example Data Collection System

Figure 10:
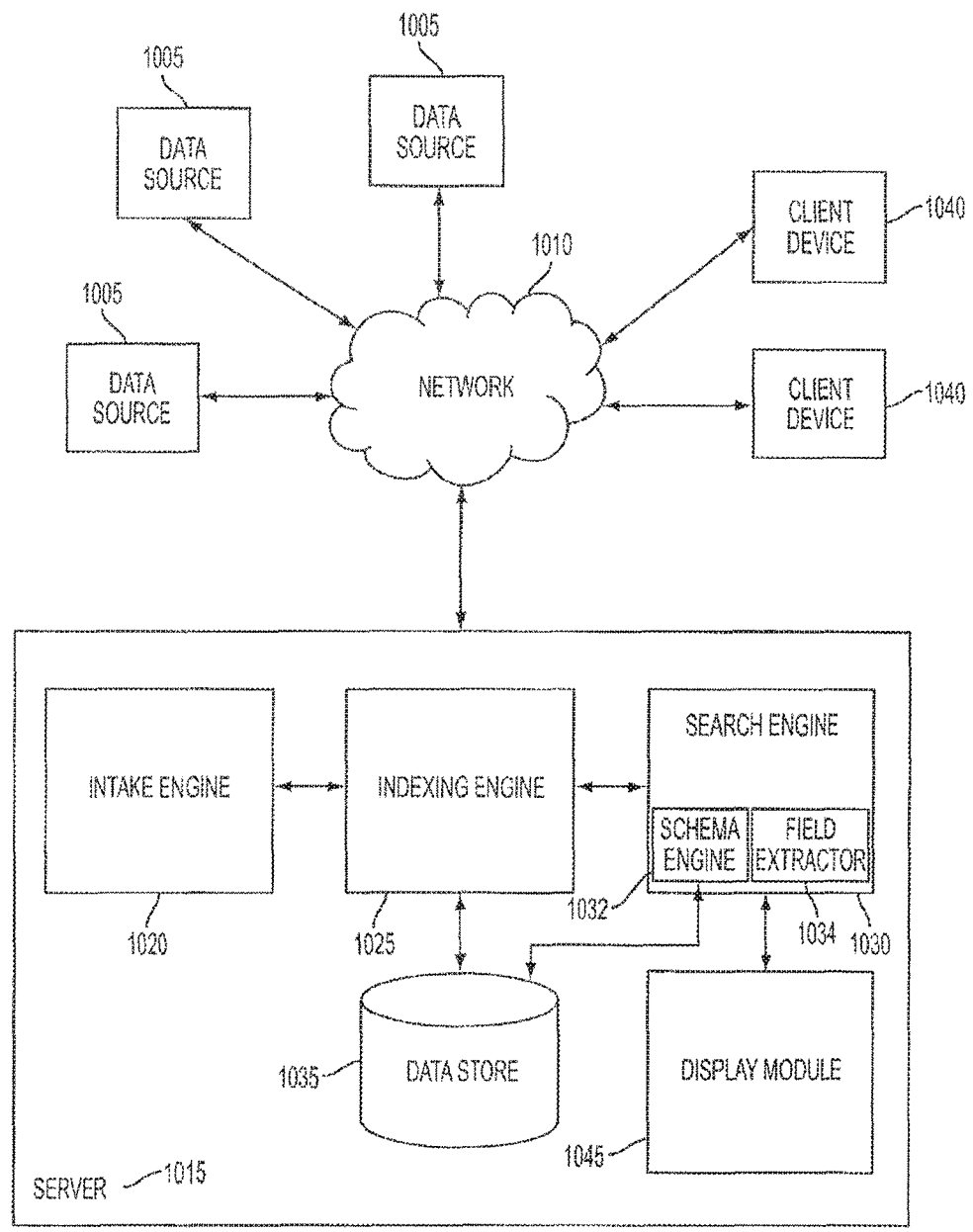
FIG. 10 is a block diagram illustrating a system for collecting and searching unstructured time stamped events.

FIG. 10 shows a block diagram illustrating a system for collecting and searching unstructured time stamped events. The system comprises a server 1015 that communicates with a plurality of data sources 1005 and a plurality of client devices 1040 over a network 1010, e.g., the Internet, etc. In various embodiments, the network 1010, may include a local area network (LAN), a wide area network (WAN), a wireless network, and the like. In other embodiments, functions described with respect to a client application or a server application in a distributed network environment may take place within a single client device without server 1015 or network 1010.

In various embodiments, server 1015 may comprise an intake engine 1020 (e.g., a forwarder that collects data from data sources and forward to other modules, etc.), an indexing engine 1025, and a search engine 1030. Intake engine 1020 receives data, for example, from data sources 1005 such as a data provider, client, user, etc. The data can include automatically collected data, data uploaded by users, or data provided by the data provider directly. In various embodiments, the data received from data sources 1005 may be unstructured data, which may come from computers, routers, databases, operating systems, applications, map data or any other source of data. Each data source 1005 may be producing one or more different types of machine data, e.g. server logs, activity logs, configuration files, messages, database records, and the like. Machine data can arrive synchronously or asynchronously from a plurality of sources. There may be many machine data sources and large quantities of machine data across different technology and application domains. For example, a computer may be logging operating system events, a router may be auditing network traffic events, a database may be cataloging database reads and writes or schema changes, and an application may be sending the results of one application call to another across a message queue.

In some embodiments, one or more data sources 1005 may provide data with a structure that allows for individual events and field values within the events to be easily identified. The structure can be predefined and/or identified within the data. For example, various strings or characters can separate and/or identify fields. As another example, field values can be arranged within a multi-dimensional structure, such as a table. In some instances, data partly or completely lacks an explicit structure. For example, in some instances, no structure for the data is present when the data is received and instead is generated later. The data may include a continuous data stream having multiple events, each with multiple field values.

In various embodiments, indexing engine 1025 may receive unstructured machine data from the intake engine 1020 and process the machine data into individual time stamped events that allow for fast keyword searching. The time information for use in creating the time stamp may be extracted from the data in the event. In addition to a time stamp, the indexing engine 1025 may also include various default fields (e.g., host and source information, etc.) when indexing the events. The individual time stamped events are considered semi-structured time series data, which may be stored in an unaltered state in the data store 1035.

In the embodiment shown in FIG. 10, the data store 1035 is shown as being co-located with server 1015. However, in various embodiments, the data store 1035 may not be physically located with server 1015. For example, data store 1035 may be located at one of the client devices 1040, in an external storage device coupled to server 1015, or accessed through network 1010. The system may store events based on various attributes (e.g., the time stamp for the event, the source of the event, the host for the event, etc.). For example, a field value identifying a message sender may be stored in one of ten data stores, the data store being chosen based on the event time stamp. In some instances, rather than grouping various data components at specific storage areas, data store 1035 may include an index that tracks identifiers of events and/or fields and identifiers of field values. Thus, for example, the index can include an element for "Data type="webpage request" (indicating that the element refers to a field value of "webpage request" for the field "data type") and then list identifiers for events with the field value (e.g., "Events 3, 7, 9 and 16", etc.).

Selective storage grouping can be referred to as storing data in "buckets". Bucket definitions can be fixed or defined based on input from a data provider, client or user. In embodiments that use a time-series data store, such that events and/or field values are stored at locations based on a timestamp extracted from the events, events with recent timestamps (e.g., which may have a higher likelihood of being accessed, etc.) may be stored at preferable memory locations that lend to quicker subsequent retrieval. Storing events in buckets allows for parallel search processing, which may reduce search time.

In various embodiments, search engine 1030 may provide search and reporting capabilities. Search engine 1030 may include a schema engine 1032 and a field extractor 1034. In various embodiments, search engine 1030 receives a search query from client device 1040 and uses late binding schema to conduct a search, which imposes field extraction on the data at query time rather than at storage or intake time.

Schema engine 4010 can itself estimate a schema or can determine a schema based on input from a client or data provider. The input can include the entire schema or restrictions or identifications that may be used to estimate or determine a full schema. Such input can be received to identify a schema for use with the unstructured data and can be used to reliably extract field values during a search. The schema can be estimated based on patterns in the data (e.g., patterns of characters or breaks in the data, etc.) or headers or tags identifying various fields in the data, such as <event><message time>2014.01.05.06.59.59</> . . . </>). Schema can be received or estimated at any of a variety of different times, including (in some instances) any time between indexing of the data and a query time. Schema engine 410 can perform the schema estimation once or multiple times (e.g., continuously or at routine intervals, etc.). Once a schema is determined, it can be modified, for example periodically, at regular times or intervals, upon receiving modification-requesting input, upon detecting a new or changed pattern in the input, or upon detecting suspicious extracted field values (e.g., being of an inconsistent data type, such as strings instead of previously extracted integers, etc.), etc. In some instances, a client or data provider can provide input indicating a satisfaction with or correction to estimated schema. Received or estimated schemas are stored in the data store 1035.

Search engine 1030 can perform real-time searches on data once indexed or it may perform search after the data is stored. If the search query is a real-time late binding schema based search, the query is used to retrieve time stamped events from indexing engine 1025. In some embodiments, real-time searches can be forward-looking searches for future events that have not yet occurred. For example, a user may want to monitor the activity of an organization's Information Technology (IT) infrastructure by having a continuously updated display of the top IP addresses that produce ERROR messages. Alternatively, if the search is a non-real-time search, the query may be used to obtain past events that are already stored in data store 1035. Non-real-time searches, or historical searches, are backwards-looking searches for events that have already occurred. For example, a user might want to locate the top IP addresses that produced ERROR messages within the last three hours. Additionally, if the search is a hybrid search query, events can be retrieved from both indexing engine 1025 and data store 1035. Hybrid search queries are both forwards and backwards looking. An example is a search query for the top IP addresses that produced ERROR messages in a time window that started four hours ago and continues indefinitely into the future. At any time during either search process, search engine 1030 may collect the search results to generate a report of the search results. The report is output to client device 1040 for presentation to a user.

Once the user defines the search string and schema for the search, the search engine 1030 can subsequently access and search all or part of the data store. For example, search engine 1030 can retrieve all events having a timestamp within a defined time period, or all events having a first field value (e.g., HTTP method, etc.) set to a specified value (e.g., GET, etc.). The search may include a request to return values for one or more first fields for all events having specified values (e.g., specific values or values within a specific range, etc.) for one or more second fields (e.g., the late binding schema applied at search time, etc.). To illustrate, search engine 1030 can retrieve all URLs in events having a timestamp within a defined time period, or all events having a first field value (e.g., HTTP method, etc.) set to a specified value (e.g., GET, etc.). In various embodiments, upon retrieving the event data of interest, search engine 1030 may further apply a late binding schema to extract particular field from the search results. The processing may be performed based on an individual value (e.g., to obtain a length or determine if an extracted field value matches a specified value, etc.). In some instances, processing can be performed across values, for example, to determine an average, frequency, count or other statistic, etc. Search engine 1030 can return the search result to a data provider, client or user (e.g., via an interface on client device 1040, etc.).

Client devices 1040 may be personal computers, digital assistants, personal digital assistants, cellular phones, mobile phones, mobile devices (e.g., tablets, etc.), laptop computers, Internet appliances, and other processor-based devices. In various embodiments, client devices 140 may be any type of processor-based platform that operates on any suitable operating system that is capable of executing one or more user application programs. For example, client device 140 can include a personal computer executing a web browser that sends search queries to server 115 and receives a search report from server 1015.

One or more of the devices illustrated in FIG. 10 may be connected to a network as previously mentioned. In some embodiments, all devices in FIG. 10 are connected to the network and communicate with each other over the network.

It should be noted that network 110 in FIG. 10 need not be a single network (such as only the Internet) and may be multiple networks (whether connected to each other or not). In another embodiment, the network may be a local area network ("LAN") and a wide area network ("WAN") (e.g., the Internet, etc.) such that one or more devices (for example, server 1015 and data store 1035) are connected together via the LAN, and the LAN is connected to the WAN which in turn is connected to other devices (for example, client devices 1040 and data sources 1005). The terms "linked together" or "connected together" refers to devices having a common network connection via a network (either directly on a network or indirectly through multiple networks), such as one or more devices on the same LAN, WAN or some network combination thereof.

It should be understood that FIG. 10 is an example embodiment of the present system and various other configurations are within the scope of the present system. Additionally, it should be understood that additional devices may be included in the system shown in FIG. 10, or in other embodiments, certain devices may perform the operation of other devices shown in the figure. For purposes of this disclosure, reference to a server, a computer, or processor, shall be interpreted to include: a single server, a single processor or a single computer; multiple servers; multiple processors, or multiple computers; or any combination of servers and processors. Thus, while only a single server is illustrated, the term "computer", "server", and "processor" may also include any collection of computers, servers or processors that individually or jointly execute a set (or multiple sets) of instructions to perform any one or more of the methodologies discussed herein.

Various features of the system, such as those described above, may be modified to include features, feature connections and/or flows as described in Carasso, David. *Exploring Splunk Search Processing Language (SPL) Primer and Cookbook*. New York: CITO Research, 2012 and/or as described in Ledion Bitincka, Archana Ganapathi, Stephen Sorkin, and Steve Zhang. *Optimizing data analysis with a semi-structured time series database*. In SLAML, 2010. Each of these references is hereby incorporated by reference in its entirety.

17. Additional Technical Details

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software, etc.) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described herein with reference to block diagrams and flowchart illustrations of methods, apparatuses (e.g., systems, etc.) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

18. Example Process Flow

Figure 12:
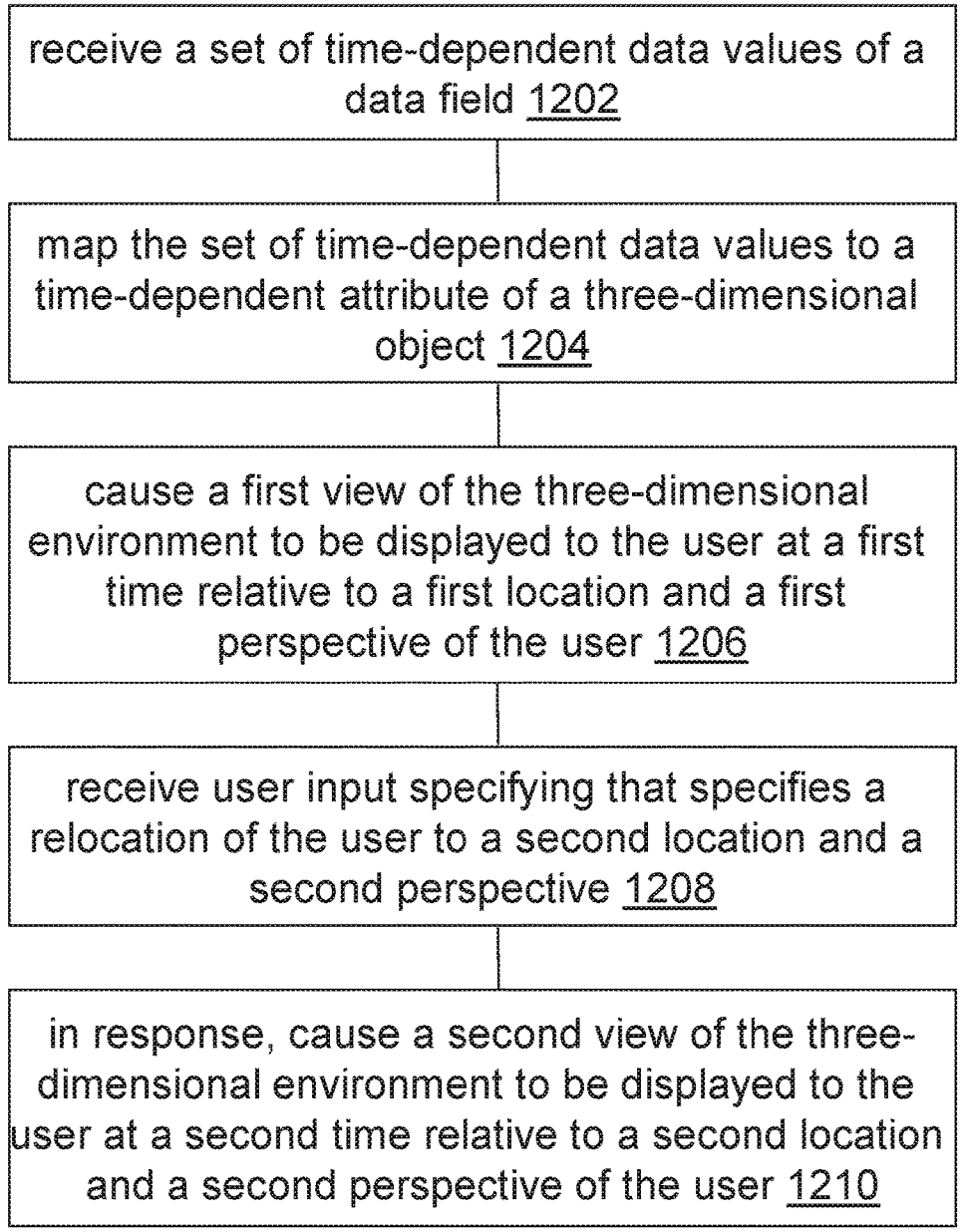
FIG. 12 illustrates an example process flow.

FIG. 12 illustrates an example process flow. In some embodiments, this process flow is performed by a data display server (e.g., as shown in FIG. 1, etc.) comprising one or more computing devices or units. In block 1202, the data display server receives a set of time-dependent data values of a data field. The set of time-dependent data values comprises values, of the data field, taken over time.

In block 1204, the data display server maps the set of time-dependent data values of the data field to a time-dependent attribute of a three-dimensional object of a three-dimensional environment that comprises a representation of a user.

In block 1206, the data display server causes a first view of the three-dimensional environment to be displayed to the user at a first time. The three-dimensional object as represented in the three-dimensional environment and the user as represented in the three-dimensional environment at the first time have a first finite distance between each other in the three-dimensional environment. The first view of the three-dimensional environment is a view of the three-dimensional environment relative to a first location and a first perspective of the user as represented in the three-dimensional environment at the first time.

In block 1208, the data display server receives user input that specifies that the user as represented in the three-dimensional environment has relocated in the three-dimensional environment to have a second location and a second perspective; a combination of the second location and the second perspective is different from a combination of the first location and the first perspective.

In block 1206, the data display server, in response to receiving the user input, causes a second different view of the three-dimensional environment to be displayed to a user at a second time that is later than the first time. The three-dimensional object as represented in the three-dimensional environment and the user as represented in the three-dimensional environment at the second time have a second finite distance between each other in the three-dimensional environment. The second view of the three-dimensional environment is a view of the three-dimensional environment relative to the second location and the first perspective of the user as represented in the three-dimensional environment at the second time.

In an embodiment, the set of time-dependent data values comprises a first value of the data field at the first time and a second different value of the data field at the second time; the attribute of the three-dimensional object has a first visual appearance, in the first view at the first time, that is visibly different from a second visual appearance which the attribute of the three-dimensional object has in the second view at the second time.

In an embodiment, the set of time-dependent data values comprises one or more of measurements streamed from a real-world component, measurements collected in real time by a data collection device, measurements stored in one or more measurement data repositories, streams of machine data collected from one or more of sensors or computing devices, web logs collected from one or more of web servers or web clients, streams of unstructured data comprising unparsed data fields, or time series data stores.

In an embodiment, the three-dimensional object represents one of cubic shapes, three-dimensional rectangular shapes, three-dimensional polygonal shapes, three-dimensional conic shapes, three-dimensional regular shapes, three-dimensional irregular shapes, etc.

In an embodiment, the attribute of the three-dimensional objects represents a specific visual property of a three-dimensional shape.

In an embodiment, the attribute of the three-dimensional objects represents one of facets, aspects, shapes, colors, textures, sizes, heights, widths, depths, materials, lighting, beaconing, light pulsating, transparency, visual effects, etc., of a three-dimensional shape.

In an embodiment, the three-dimensional environment comprises a second three-dimensional object having a second attribute to which a second set of time-dependent data values of a second data field is mapped; the first view of the three-dimensional environment comprises a visible appearance of the second three-dimensional object at the first time, while the second view of the three-dimensional environment comprises a visible appearance of the second three-dimensional object at the second time.

In an embodiment, the three-dimensional object comprises a second attribute to which a second set of time-dependent data values of a second data field is mapped; the second attribute of the three-dimensional object is visible at one or more of the first view of the three-dimensional environment at the first time or the second view of the three-dimensional environment at the second time.

In an embodiment in which the user is represented in the three-dimensional environment with a virtual camera located at the first location with the first perspective at the first time, the data display server is further configured to perform: determining, based on the user input, a corresponding movement of the virtual camera in the three-dimensional environment; and in response to determining the corresponding movement of the virtual camera, moving the virtual camera in the three-dimensional environment to be located at the second location with the second perspective at the second time.

In an embodiment, the data display server is further configured to perform: generating a three-dimensional clustering object in the three-dimensional environment, wherein the three-dimensional clustering object includes a portion of each of one or more three-dimensional objects that include the three-dimensional object; and causing the three-dimensional clustering object to be rendered in at least one of the first view of the three-dimensional environment at the first time or the second view of the three-dimensional environment at the second time.

In an embodiment, the data display server is further configured to perform: generating a three-dimensional clustering object in the three-dimensional environment, wherein the three-dimensional clustering object includes a portion of each of one or more three-dimensional objects that include the three-dimensional object; and causing the three-dimensional clustering object to be rendered in a prior view of the three-dimensional environment relative to a prior location and a prior perspective of the user at a prior time before the first time, the three-dimensional object not being rendered in the prior view of the three-dimensional environment, and wherein the first view is rendered in response to receiving prior user input that selects the three-dimensional clustering object between the prior time and the first time.

In an embodiment, the data display server is further configured to perform: generating a first-level three-dimensional clustering object in the three-dimensional environment, the first-level three-dimensional clustering object including a portion of each of one or more three-dimensional objects that include the three-dimensional object; generating a second-level three-dimensional clustering object in the three-dimensional environment, the second-level three-dimensional clustering object including a portion of the three-dimensional clustering object and at least a portion of another three-dimensional clustering object or another three-dimensional object; and causing the second-level three-dimensional clustering object to be rendered in a clustering view of the three-dimensional environment relative to a specific location and a specific perspective of the user at a specific time.

In an embodiment, the data display server is further configured to perform: generating a three-dimensional clustering object in the three-dimensional environment, the three-dimensional clustering object having at least a portion of each of two or more three-dimensional objects that include the three-dimensional object, the two or more three-dimensional objects comprising two or more visual state indicators, and each of the two or more three-dimensional objects comprising a respective visual state indicator in the two or more visual state indicators; and causing the three-dimensional clustering object to be rendered with a visual state indicator in a clustering view of the three-dimensional environment relative to a specific location and a specific perspective of the user at a specific time, the visual state indicator of the three-dimensional clustering object being selected to be the same as a specific visual state indicator of a specific three-dimensional object in the two or more visual state indicators of the two or more three-dimensional objects.

In an embodiment, one or more of first-level three-dimensional clustering objects, second-level three-dimensional objects, or n-th level three-dimensional objects are visible in at least one of the first view of the three-dimensional environment at the first time or the second view of the three-dimensional environment at the second time, where n is a positive integer greater than zero.

In an embodiment, the data field as mentioned above is a data field of a data object representing a real-world component; a time-dependent state of the real-world component is determined based at least in part on the set of time-dependent data values of the data field. In an embodiment, the real-world component represents one or more of cloud-based clustered systems, cloud-based data centers, host clusters, hosts, virtual machines, computing processors, computing processes, etc. In an embodiment, the time-dependent state of the real-world component at a given time represents a specific state that is selected, based at least in part on the set of time-dependent values at the given time, from a finite number of discrete states of a specific type. In an embodiment, the time-dependent state of the real-world component represents a specific type of state among a finite number of types of state.

In an embodiment, the data display server is further configured to perform: recording a trajectory of the user as represented in the three-dimensional environment for a time interval, the time interval including both the first time and the second time, the trajectory comprising the first location and the first perspective of the user at the first time and the second location and the second perspective of the user at the second time; and causing a plurality of views of the three-dimensional environment to be rendered based on the recorded trajectory of the user in a replaying of the trajectory of the user, the plurality of views comprising the first view of the three-dimensional environment as rendered at the first time and the second view of the three-dimensional environment as rendered at the second time.

In an embodiment, the data display server is further configured to perform: recording a plurality of views of the three-dimensional environment displayed to the user for a time interval, the time interval including both the first time and the second time; and causing the plurality of views of the three-dimensional environment to be rendered in a replaying of the plurality of views, the plurality of views comprising the first view of the three-dimensional environment as rendered at the first time and the second view of the three-dimensional environment as rendered at the second time.

In an embodiment in which the set of time-dependent values of the data field is a part of input data mapped to attributes of one or more of three-dimensional objects or three-dimensional clustering objects represented in the three-dimensional environment, the data display server is further configured to perform: recording a specific portion of the input data corresponding to a specific time interval, the specific time interval including both the first time and the second time; and causing a plurality of views of the three-dimensional environment to be rendered in a re-exploration of the specific portion of the input data, the plurality of views in the re-exploration of the specific portion of the input data comprising one or more of same views of the three-dimensional environment as rendered in the specific time interval, or at least one different view replacing at least one of the same views of the three-dimensional environment.

In an embodiment, the three-dimensional environment comprises one or more of contiguous spatial portions or non-contiguous spatial portions.

In an embodiment, the data display server is further configured to perform: while the first view of the three-dimensional environment is being rendered on a first display device to the user at the first time, causing the first view of the three-dimensional environment to be rendered on a second display device to a second user at the first time.

In an embodiment, the data display server is further configured to perform: while the first view of the three-dimensional environment is being rendered on a first display device to the user at the first time, causing a different view, other than the first view, of the three-dimensional environment to be rendered on a second display device to a second user at the first time, the different view being a view—of the three dimensional environment—relative to a different location and a different perspective of the second user as represented in the three dimensional environment.

In an embodiment, the three-dimensional environment is dynamically generated based on a single user command that specifies a set of one or more relationships each of which is one of a relationship between a data field and an attribute of one of one or more three-dimensional objects represented by the three-dimensional environment.

In an embodiment, the three-dimensional environment is dynamically superimposed with a portion of a real-world three-dimensional environment in which the user moves; the user input is generated through one or more sensors configured to track the user's motion.

In an embodiment, the data display server is further configured to perform: receiving second user input that specifies an action to be performed with a component relating to one or more attributes of one or more three-dimensional objects represented in the three-dimensional environment; and causing the action to be performed on the component.

In an embodiment, the data display server is further configured to perform: receiving second user input that specifies attaching a specific marker to the three-dimensional object; and causing the specific marker to be attached to the three-dimensional object as represented in the three-dimensional environment.

Embodiments include a system that, according to various embodiments, comprises a processor and memory and is adapted for: (1) receiving a first set of data that includes at least a value of a first variable taken over time; (2) receiving a second set of data that includes at least a value of a second variable taken over time; (3) mapping, by at least one processor, the value of the first variable to a particular attribute of a first three dimensional object so that the particular attribute of the first three dimensional object changes over time to correspond to changes in the first particular variable; (4) mapping, by at least one processor, the value of the second variable to a particular attribute of a second three dimensional object in real time so that the particular attribute of the second three dimensional object changes over time to correspond to changes in the second particular variable; (5) allowing a user to view the first and second three dimensional objects from a first person perspective by: (a) using at least one processor to facilitate allowing the user to dynamically move a virtual camera, in three dimensions, relative to the first and second three dimensional objects as the respective particular attributes of the first and second three dimensional objects change over time to reflect changing values of the first and second particular variables; and (b) displaying the first and second three dimensional objects to the user from the perspective of the virtual camera as the camera moves relative to the first and second three dimensional objects.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods. Note that, although separate embodiments are discussed herein, any combination of embodiments and/or partial embodiments discussed herein may be combined to form further embodiments.

19. Example System Architecture

Figure 11:
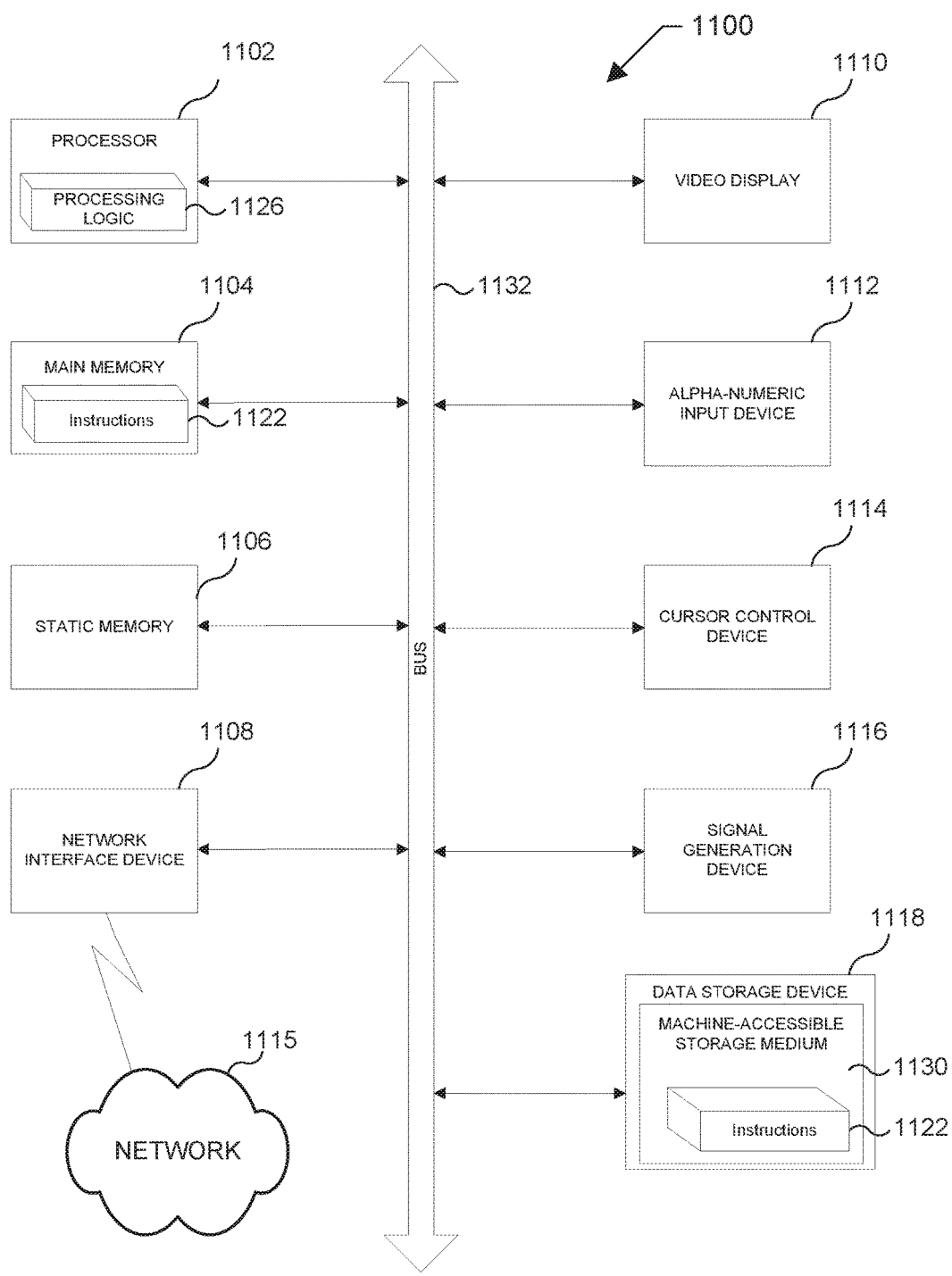
FIG. 11 is a schematic diagram of a computer, such as the data display server of FIG. 1 that is suitable for use in various embodiments.

FIG. 11 illustrates a diagrammatic representation of a computer architecture 1100 that can be used within the System 100, for example, as a client computer (e.g., one of the computing devices 120, 130 shown in FIG. 1, etc.), or as a server computer (e.g., Data Display Server 100 shown in FIG. 1, etc.). In particular embodiments, the computer 1100 may be suitable for use as a computer within the context of the System 100 that is configured to facilitate various data display methodologies described above.

In particular embodiments, the computer 1100 may be connected (e.g., networked, etc.) to other computers in a LAN, an intranet, an extranet, and/or the Internet. As noted above, the computer 1100 may operate in the capacity of a server or a client computer in a client-server network environment, or as a peer computer in a peer-to-peer (or distributed) network environment. The Computer 920 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An example computer 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 106 (e.g., flash memory, static random access memory (SRAM), etc.), and a data storage device 1118, which communicate with each other via a bus 1132.

The processing device 1102 represents one or more general-purpose processing devices such as a microprocessor, a central processing unit, or the like. More particularly, the processing device 1102 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 may be configured to execute processing logic 1126 for performing various operations and steps discussed herein.

The computer 1100 may further include a network interface device 1108. The computer 1100 also may include a video display unit 1110 (e.g., a liquid crystal display (LCD) or a cathode ray tube (CRT), etc.), an alphanumeric input device 1112 (e.g., a keyboard, etc.), a cursor control device 1114 (e.g., a mouse, etc.), a signal generation device 1116 (e.g., a speaker, etc.), etc.

The data storage device 1118 may include a non-transitory computer-accessible storage medium 1130 (also known as a non-transitory computer-readable storage medium or a non-transitory computer-readable medium) on which is stored one or more sets of instructions (e.g., software 1122, etc.) embodying any one or more of the methodologies or functions described herein. The software 1122 may also reside, completely or at least partially, within the main memory 1104 and/or within the processing device 1102 during execution thereof by the computer 1100—the main memory 1104 and the processing device 1102 also constituting computer-accessible storage media. The software 1122 may further be transmitted or received over a network 1115 via a network interface device 1108.

While the computer-accessible storage medium 1130 is shown in an example embodiment to be a single medium, the term "computer-accessible storage medium" should be understood to include a single medium or multiple media (e.g., a centralized or distributed database, and/or associated caches and servers, etc.) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

20. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   receiving data from an external data source, wherein the data comprises real-time machine data that reflects activity within an information technology environment;
   generating a three-dimensional model that includes a first plurality of three-dimensional objects, wherein each three-dimensional object included in the first plurality of three-dimensional objects has multiple attributes and a state derived from at least one aspect of the data, and each of the multiple attributes of the first three-dimensional object is mapped to one or more different aspects of the real-time machine data;
   generating a first clustering object within the three-dimensional model, wherein the first clustering object encompasses the first plurality of three-dimensional objects;
   determining a first state associated with a first three-dimensional object included in the first plurality of three-dimensional objects, wherein the first state comprises a variable alert state having one of at least three alert states, and wherein the first state is determined based on at least one aspect of the real-time machine data mapped to the first three-dimensional object and any corresponding aspects inherited from one or more lower level hierarchical components associated with the at least one first three-dimensional object;
   determining a second state associated with a second three-dimensional object included in the plurality of three-dimensional objects, wherein the second state comprises a variable alert state having one of at least three alert states, and wherein the second state determination is based on at least one aspect of real-time machine data mapped to the second three dimensional object and at least one corresponding aspect inherited from one or more lower level hierarchical components associated with the at least one second three-dimensional object, wherein the first and second three-dimensional object are different three-dimensional objects within the plurality of three-dimensional objects;
   determining a clustering object alert level associated with the first clustering object based on a comparison between the alert state associated with the first state and the alert state associated with the second state, wherein the alert level comprises one of at least three alert states, and wherein the first clustering object inherits the alert state from each of the first three-dimensional object and the second three-dimensional object;
   selecting a cluster state associated with the first clustering object based on the clustering object alert level, wherein the cluster state causes a visual aspect of the first clustering object to change as the cluster state changes, wherein the visual aspect is different for each of the at least three alert states; and
   displaying a first portion of the three-dimensional model that includes the first clustering object and a graphical representation of the cluster state.

2. The method of claim 1, wherein selecting the cluster state is further based on the first state indicating a higher alert state relative to the second state.

3. The method of claim 1, wherein the first state is selected as the cluster state based on the first graphical object representing a first component within the information technology environment having a higher priority than a priority associated with a second component within the information technology infrastructure represented by the second graphical object.

4. The method of claim 1, wherein the change in the visual aspect of the first clustering object comprises beaconing or pulsating clustering object beacons or pulsates with a first frequency as the first state of the first three-dimensional object comprises a first alert state and beaconing or pulsating with a second frequency as the first state of the first three-dimensional object comprises a second alert state.

5. The method of claim 1, wherein the three-dimensional model includes a second plurality of three-dimensional objects, wherein each three-dimensional object included in the second plurality of three-dimensional objects has multiple attributes and a state derived from at least one aspect of the data, and further comprising:
   generating a second clustering object within the three-dimensional model, wherein the second clustering object encompasses the second plurality of three-dimensional objects and has a state derived from the states associated with the second plurality of three-dimensional objects; and
   displaying a second portion of the three-dimensional model that includes the second clustering object.

6. The method of claim 1, wherein the three-dimensional model includes a second plurality of three-dimensional objects, wherein each three-dimensional object included in the second plurality of three-dimensional objects has multiple attributes and a state derived from at least one aspect of the data, and further comprising:
   generating a second clustering object within the three-dimensional model, wherein the second clustering object encompasses the second plurality of three-dimensional objects and has a state derived from the states associated with the second plurality of three-dimensional objects;
   generating a third clustering object within the three dimensional model, wherein the third clustering object encompasses the first clustering object and the second clustering object and has a state derived from the clustering state of the first clustering object and the state of the second clustering object; and
   displaying a third portion of the three-dimensional model that includes the third clustering object.

7. The method of claim 1, wherein the three-dimensional model includes a second plurality of three-dimensional objects, wherein each three-dimensional object included in the second plurality of three-dimensional objects has multiple attributes and a state derived from at least one aspect of the data, and further comprising:
   generating a second clustering object within the three-dimensional model, wherein the second clustering object encompasses the second plurality of three-dimensional objects and has a state derived from the states associated with the second plurality of three-dimensional objects;
   generating a third clustering object within the three dimensional model, wherein the third clustering object encompasses the first clustering object and the second clustering object and has a state derived from the clustering state of the first clustering object and the state of the second clustering object; and
   displaying a third portion of the three-dimensional model that includes the third clustering object,
   wherein the third clustering object represents a data center, the first clustering object represents a first sever machine within the data center, the second clustering object represents a second server machine within the data center.

8. The method of claim 1, wherein the three-dimensional model includes a second plurality of three-dimensional objects, wherein each three-dimensional object included in the second plurality of three-dimensional objects has multiple attributes and a state derived from at least one aspect of the data, and further comprising:
   generating a second clustering object within the three-dimensional model, wherein the second clustering object encompasses the second plurality of three-dimensional objects and has a state derived from the states associated with the second plurality of three-dimensional objects;
   generating a third clustering object within the three dimensional model, wherein the third clustering object encompasses the first clustering object and the second clustering object and has a state derived from the clustering state of the first clustering object and the state of the second clustering object; and
   displaying a third portion of the three-dimensional model that includes the third clustering object,
   wherein the third clustering object represents a data center, the first clustering object represents a first sever machine within the data center, the second clustering object represents a second server machine within the data center, the first plurality of three-dimensional objects represent different processors or virtual machines executing within the first server machine, and the second plurality of three-dimensional objects represent different processors or virtual machines executing within the second server machine.

9. The method of claim 1, wherein the real-time machine data is generated by at least one of a server machine, a processor, and a virtual machine.

10. The method of claim 1, wherein the real-time machine data is generated by at least one of a server machine, a processor, and a virtual machine, and each of the multiple attributes of the first three-dimensional object is mapped to different aspects of the real-time machine data.

11. A non-transitory computer-readable medium including instructions that, when executed by a processor, cause the processor to perform the steps of:
   receiving data from an external data source, wherein the data comprises real-time machine data that reflects activity within an information technology environment;
   generating a three-dimensional model that includes a first plurality of three-dimensional objects, wherein each three-dimensional object included in the first plurality of three-dimensional objects has multiple attributes and a state derived from at least one aspect of the data, and each of the multiple attributes of the first three-dimensional object is mapped to one or more different aspects of the real-time machine data;
   generating a first clustering object within the three-dimensional model, wherein the first clustering object encompasses the first plurality of three-dimensional objects;
   determining a first state associated with a first three-dimensional object included in the first plurality of three-dimensional objects, wherein the first state comprises a variable alert state having one of at least three alert states, and wherein the first state is determined based on at least one aspect of the real-time machine data mapped to the first three-dimensional object and any corresponding aspects inherited from one or more lower level hierarchical components associated with the at least one first three-dimensional object;
   determining a second state associated with a second three-dimensional object included in the plurality of three-dimensional objects, wherein the second state comprises a variable alert state having one of at least three alert states, and wherein the second state determination is based on at least one aspect of real-time machine data mapped to the second three dimensional object and at least one corresponding aspect inherited from one or more lower level hierarchical components associated with the at least one second three-dimensional object, wherein the first and second three-dimensional object are different three-dimensional objects within the plurality of three-dimensional objects;
   determining a clustering object alert level associated with the first clustering object based on a comparison between the alert state associated with the first state and the alert state associated with the second state, wherein the alert level comprises one of at least three alert states, and wherein the first clustering object inherits the alert state from each of the first three-dimensional object and the second three-dimensional object;
   selecting a cluster state associated with the first clustering object based on the clustering object alert level, wherein the cluster state causes a visual aspect of the first clustering object to change as the cluster state changes, wherein the visual aspect is different for each of the at least three alert states; and displaying a first portion of the three-dimensional model that includes the first clustering object and a graphical representation of the cluster state.

12. The non-transitory computer-readable medium of claim 11, wherein selecting the cluster state is further based on the first state indicating a higher alert state relative to the second state.

13. The non-transitory computer-readable medium of claim 11, wherein the first state is selected as the cluster state based on the first graphical object representing a first component within the information technology environment having a higher priority than a priority associated with a second component within the information technology infrastructure represented by the second graphical object.

14. The non-transitory computer-readable medium of claim 11, wherein the change in the visual aspect of the first clustering object comprises beaconing or pulsating clustering object beacons or pulsates with a first frequency as the first state of the first three-dimensional object comprises a first alert state and beaconing or pulsating with a second frequency as the first state of the first three-dimensional object comprises a second alert state.

15. The non-transitory computer-readable medium of claim 11, wherein the three-dimensional model includes a second plurality of three-dimensional objects, wherein each three-dimensional object included in the second plurality of three-dimensional objects has multiple attributes and a state derived from at least one aspect of the data, and further comprising:

generating a second clustering object within the three-dimensional model, wherein the second clustering object encompasses the second plurality of three-dimensional objects and has a state derived from the states associated with the second plurality of three-dimensional objects; and displaying a second portion of the three-dimensional model that includes the second clustering object.

16. The non-transitory computer-readable medium of claim 11, wherein the three-dimensional model includes a second plurality of three-dimensional objects, wherein each three-dimensional object included in the second plurality of three-dimensional objects has multiple attributes and a state derived from at least one aspect of the data, and further comprising:

generating a second clustering object within the three-dimensional model, wherein the second clustering object encompasses the second plurality of three-dimensional objects and has a state derived from the states associated with the second plurality of three-dimensional objects;

generating a third clustering object within the three dimensional model, wherein the third clustering object encompasses the first clustering object and the second clustering object and has a state derived from the clustering state of the first clustering object and the state of the second clustering object; and displaying a third portion of the three-dimensional model that includes the third clustering object.

17. The non-transitory computer-readable medium of claim 11, wherein the three-dimensional model includes a second plurality of three-dimensional objects, wherein each three-dimensional object included in the second plurality of three-dimensional objects has multiple attributes and a state derived from at least one aspect of the data, and further comprising:

generating a second clustering object within the three-dimensional model, wherein the second clustering object encompasses the second plurality of three-dimensional objects and has a state derived from the states associated with the second plurality of three-dimensional objects;

generating a third clustering object within the three dimensional model, wherein the third clustering object encompasses the first clustering object and the second clustering object and has a state derived from the clustering state of the first clustering object and the state of the second clustering object; and displaying a third portion of the three-dimensional model that includes the third clustering object, wherein the third clustering object represents a data center, the first clustering object represents a first sever machine within the data center, the second clustering object represents a second server machine within the data center.

18. The non-transitory computer-readable medium of claim 11, wherein the three-dimensional model includes a second plurality of three-dimensional objects, wherein each three-dimensional object included in the second plurality of three-dimensional objects has multiple attributes and a state derived from at least one aspect of the data, and further comprising:

generating a second clustering object within the three-dimensional model, wherein the second clustering object encompasses the second plurality of three-dimensional objects and has a state derived from the states associated with the second plurality of three-dimensional objects;

generating a third clustering object within the three dimensional model, wherein the third clustering object encompasses the first clustering object and the second clustering object and has a state derived from the clustering state of the first clustering object and the state of the second clustering object; and displaying a third portion of the three-dimensional model that includes the third clustering object, wherein the third clustering object represents a data center, the first clustering object represents a first sever machine within the data center, the second clustering object represents a second server machine within the data center, the first plurality of three-dimensional objects represent different processors or virtual machines executing within the first server machine, and the second plurality of three-dimensional objects represent different processors or virtual machines executing within the second server machine.

19. The non-transitory computer-readable medium of claim 11, wherein the real-time machine data is generated by at least one of a server machine, a processor, and a virtual machine.

20. The non-transitory computer-readable medium of claim 11, wherein the real-time machine data is generated by at least one of a server machine, a processor, and a virtual machine, and each of the multiple attributes of the first three-dimensional object is mapped to different aspects of the real-time machine data.

21. A computer system, comprising:
a memory that includes instructions; and a processor that is coupled to the memory and, when executing the instructions, is configured to perform the steps of:

receiving data from an external data source, wherein the data comprises real-time machine data that reflects activity within an information technology environment;

generating a three-dimensional model that includes a first plurality of three-dimensional objects, wherein each three-dimensional object included in the first plurality of three-dimensional objects has multiple attributes and a state derived from at least one aspect of the data, and each of the multiple attributes of the first three-dimensional object is mapped to one or more different aspects of the real-time machine data;

generating a first clustering object within the three-dimensional model, wherein the first clustering object encompasses the first plurality of three-dimensional objects;

determining a first state associated with a first three-dimensional object included in the first plurality of three-dimensional objects, wherein the first state comprises a variable alert state having one of at least three alert states, and wherein the first state is determined based on at least one aspect of the real-time machine data mapped to the first three-dimensional object and any corresponding aspects inherited from one or more lower level hierarchical components associated with the at least one first three-dimensional object;

determining a second state associated with a second three-dimensional object included in the plurality of three-dimensional objects, wherein the second state comprises a variable alert state having one of at least three alert states, and wherein the second state determination is based on at least one aspect of real-time machine data mapped to the second three dimensional object and at least one corresponding aspect inherited from one or more lower level hierarchical components associated with the at least one second three-dimensional object, wherein the first and second three-dimensional object are different three-dimensional objects within the plurality of three-dimensional objects;

determining a clustering object alert level associated with the first clustering object based on a comparison between the alert state associated with the first state and the alert state associated with the second state, wherein the alert level comprises one of at least three alert states, and wherein the first clustering object inherits the alert state from each of the first three-dimensional object and the second three-dimensional object;

selecting a cluster state associated with the first clustering object based on the clustering object alert level, wherein the cluster state causes a visual aspect of the first clustering object to change as the cluster state changes, wherein the visual aspect is different for each of the at least three alert states; and displaying a first portion of the three-dimensional model that includes the first clustering object and a graphical representation of the cluster state.

22. The computer system of claim 21, wherein selecting the cluster state is further based on the first state indicating a higher alert state relative to the second state.

23. The computer system of claim 21, wherein the first state is selected as the cluster state based on the first graphical object representing a first component within the information technology environment having a higher priority than a priority associated with a second component within the information technology infrastructure represented by the second graphical object.

24. The computer system of claim 21, wherein the change in the visual aspect of the first clustering object comprises beaconing or pulsating clustering object beacons or pulsates with a first frequency as the first state of the first three-dimensional object comprises a first alert state and beaconing or pulsating with a second frequency as the first state of the first three-dimensional object comprises a second alert state.

25. The computer system of claim 21, wherein the three-dimensional model includes a second plurality of three-dimensional objects, wherein each three-dimensional object included in the second plurality of three-dimensional objects has multiple attributes and a state derived from at least one aspect of the data, and further comprising:

generating a second clustering object within the three-dimensional model, wherein the second clustering object encompasses the second plurality of three-dimensional objects and has a state derived from the states associated with the second plurality of three-dimensional objects; and displaying a second portion of the three-dimensional model that includes the second clustering object.

26. The computer system of claim 21, wherein the three-dimensional model includes a second plurality of three-dimensional objects, wherein each three-dimensional object included in the second plurality of three-dimensional objects has multiple attributes and a state derived from at least one aspect of the data, and further comprising:

generating a second clustering object within the three-dimensional model, wherein the second clustering object encompasses the second plurality of three-dimensional objects and has a state derived from the states associated with the second plurality of three-dimensional objects;

generating a third clustering object within the three dimensional model, wherein the third clustering object encompasses the first clustering object and the second clustering object and has a state derived from the clustering state of the first clustering object and the state of the second clustering object; and displaying a third portion of the three-dimensional model that includes the third clustering object.

27. The computer system of claim 21, wherein the three-dimensional model includes a second plurality of three-dimensional objects, wherein each three-dimensional object included in the second plurality of three-dimensional objects has multiple attributes and a state derived from at least one aspect of the data, and further comprising:

generating a second clustering object within the three-dimensional model, wherein the second clustering object encompasses the second plurality of three-dimensional objects and has a state derived from the states associated with the second plurality of three-dimensional objects;

generating a third clustering object within the three dimensional model, wherein the third clustering object encompasses the first clustering object and the second clustering object and has a state derived from the clustering state of the first clustering object and the state of the second clustering object; and displaying a third portion of the three-dimensional model that includes the third clustering object, wherein the third clustering object represents a data center, the first clustering object represents a first sever machine within the data center, the second clustering object represents a second server machine within the data center.

28. The computer system of claim 21, wherein the three-dimensional model includes a second plurality of three-dimensional objects, wherein each three-dimensional object included in the second plurality of three-dimensional objects has multiple attributes and a state derived from at least one aspect of the data, and further comprising:
   generating a second clustering object within the three-dimensional model, wherein the second clustering object encompasses the second plurality of three-dimensional objects and has a state derived from the states associated with the second plurality of three-dimensional objects;
   generating a third clustering object within the three dimensional model, wherein the third clustering object encompasses the first clustering object and the second clustering object and has a state derived from the clustering state of the first clustering object and the state of the second clustering object; and
displaying a third portion of the three-dimensional model that includes the third clustering object,
   wherein the third clustering object represents a data center, the first clustering object represents a first sever machine within the data center, the second clustering object represents a second server machine within the data center, the first plurality of three-dimensional objects represent different processors or virtual machines executing within the first server machine, and the second plurality of three-dimensional objects represent different processors or virtual machines executing within the second server machine.

29. The computer system of claim 21, wherein the real-time machine data is generated by at least one of a server machine, a processor, and a virtual machine.

30. The computer system of claim 21, wherein the real-time machine data is generated by at least one of a server machine, a processor, and a virtual machine, and each of the multiple attributes of the first three-dimensional object is mapped to different aspects of the real-time machine data.

\* \* \* \* \*